United States Patent
Endoh et al.

(10) Patent No.: US 10,020,121 B2
(45) Date of Patent: Jul. 10, 2018

(54) DYE-SENSITIZED PHOTOELECTRIC CONVERSION ELEMENT

(71) Applicant: FUJIKURA LTD., Tokyo (JP)

(72) Inventors: Katsuyoshi Endoh, Chiba (JP); Ko Nishiwaki, Sakura (JP)

(73) Assignee: FUJIKURA LTD., Koto-ku, Tokyo (JP)

(*) Notice: Subject to any disclaimer, the term of this patent is extended or adjusted under 35 U.S.C. 154(b) by 0 days.

(21) Appl. No.: 15/509,705

(22) PCT Filed: Sep. 28, 2015

(86) PCT No.: PCT/JP2015/077405
§ 371 (c)(1),
(2) Date: Mar. 8, 2017

(87) PCT Pub. No.: WO2016/052452
PCT Pub. Date: Apr. 7, 2016

(65) Prior Publication Data
US 2017/0301483 A1    Oct. 19, 2017

(30) Foreign Application Priority Data
Sep. 30, 2014 (JP) .................................. 2014-199880

(51) Int. Cl.
*H01G 9/20* (2006.01)

(52) U.S. Cl.
CPC ......... *H01G 9/2077* (2013.01); *H01G 9/2022* (2013.01); *H01G 9/2059* (2013.01); *H01G 9/2004* (2013.01); *H01G 9/2031* (2013.01)

(58) Field of Classification Search
CPC .. H01G 9/2077; H01G 9/2022; H01G 9/2059; H01G 9/2004; H01G 9/2031
(Continued)

(56) References Cited

U.S. PATENT DOCUMENTS
2015/0243447 A1    8/2015   Okada et al.

FOREIGN PATENT DOCUMENTS
EP   2 892 106 A1   7/2015
JP   2012-186032 A  9/2012
(Continued)

OTHER PUBLICATIONS
International Search Report of PCT/JP2015/077405 dated Oct. 20, 2015. [PCT/ISA/210].

*Primary Examiner* — Jayne L Mershon
(74) *Attorney, Agent, or Firm* — Sughrue Mion, PLLC

(57) ABSTRACT

A dye-sensitized photoelectric conversion element including a cell is disclosed. The cell includes a conductive substrate and a transparent conductive layer, a counter substrate facing the conductive substrate and including a metal substrate, a semiconductor layer provided on the conductive substrate, a sealing portion bonding the conductive and the counter substrates, a connecting portion connecting one end of a wiring material and the metal substrate, and a portion to be connected which is connected to the other end of the wiring material, the connecting portion contains first conductive particles, a filler, and a binder resin, the wiring material contains second conductive particles and a binder resin, an average particle diameter of the first conductive particles is greater than that of the filler in the connecting portion, and a content rate of the filler in the connecting portion is greater than that of the filler in the wiring material.

14 Claims, 13 Drawing Sheets

(58) Field of Classification Search
USPC .......................................................... 136/256
See application file for complete search history.

(56) References Cited

FOREIGN PATENT DOCUMENTS

| | | |
|---|---|---|
| JP | 2013-080567 A | 5/2013 |
| JP | 2013-140700 A | 7/2013 |
| JP | 2013-211103 A | 10/2013 |
| JP | 2014-017207 A | 1/2014 |
| JP | 2014-049358 A | 3/2014 |
| JP | 2014-110169 A | 6/2014 |
| JP | 2014-132519 A | 7/2014 |

DYE-SENSITIZED PHOTOELECTRIC CONVERSION ELEMENT

CROSS REFERENCE TO RELATED APPLICATIONS

This application is a National Stage of International Application No. PCT/JP2015/077405 filed Sep. 28, 2015, claiming priority based on Japanese Patent Application No. 2014-199880, filed Sep. 30, 2014, the contents of all of which are incorporated herein by reference in their entirety.

TECHNICAL FIELD

The present invention relates to a dye-sensitized photoelectric conversion element.

BACKGROUND ART

As a photoelectric conversion element, a dye-sensitized photoelectric conversion element attracts attention since it is inexpensive and a high photoelectric conversion efficiency can be obtained in it, and various developments on the dye-sensitized photoelectric conversion element have been carried out.

The dye-sensitized photoelectric conversion element is generally equipped with at least one dye-sensitized photoelectric conversion cell, and the dye-sensitized photoelectric conversion cell is equipped with a conductive substrate, a counter substrate such as a counter electrode, and an annular sealing portion that connects the conductive substrate and the counter substrate. Moreover, the conductive substrate has a transparent substrate and a transparent conductive layer formed thereon, and an oxide semiconductor layer is provided between the conductive substrate and the counter substrate.

As such a dye-sensitized photoelectric conversion element, for example, one that is described in the following Patent Document 1 is known. A dye-sensitized solar cell module in which a plurality of photoelectric conversion cells provided on a transparent conductive substrate having a transparent substrate and a transparent conductive layer are connected by a wiring material such as a conductive material obtained by curing a silver paste is disclosed in the following Patent Document 1. More specifically, for example, it is disclosed in Patent Document 1 that one end of the wiring material is directly connected to the metal plate of the counter electrode of one photoelectric conversion cell between two adjacent photoelectric conversion cells and the other end of the wiring material is connected to the connecting terminal on the transparent conductive substrate of the other photoelectric conversion cell.

CITATION LIST

Patent Document

Patent Document 1: JP 2014-49358 A

SUMMARY OF THE INVENTION

Problem to be Solved by the Invention

However, the dye-sensitized solar cell module described in Patent Document 1 above has the following problem.

In other words, the dye-sensitized solar cell module described in Patent Document 1 above has room for improvement in terms of durability.

The invention has been made in view of the above circumstances, and an object thereof is to provide a dye-sensitized photoelectric conversion element having excellent durability.

Means for Solving Problem

The present inventors have carried out intensive studies in order to solve the problem described above. First, it has been recognized that the wiring material is in contact with various members and the wiring material can greatly expand and contract as these members expand and contract in association with the temperature change. Moreover, the present inventors have thought that there may be a case in which voids are formed in the vicinity of the inorganic filler when the wiring material expands and contracts in association with the temperature change and cracking of the wiring material occurs by taking the voids as the starting point so that the wiring material is disconnected if the wiring material contains a great amount of inorganic filler in addition to the conductive particles at this time. On the other hand, the present inventors have thought that the adhesive property between the conductive particles in the wiring material and the metal substrate lowers if the content rate of the inorganic filler in the wiring material is too small and the wiring material may peels off from the metal substrate when the wiring material expands and contracts in association with the temperature change. Hence, the present inventors have thought that it may work that a connecting portion to connect the wiring material and the metal substrate is provided between these and the content rate of the inorganic filler in the connecting portion is set to be greater than the content rate of the inorganic filler in the wiring material. In practice, however, there is a case in which the dye-sensitized solar cell module still has room for improvement in terms of durability only by providing such a connecting portion. Hence, the present inventors have further carried out intensive studies and, as a result, recognized that the relation between the average particle diameter of the conductive particles and the average particle diameter of the inorganic filler in the connecting portion is important in order to improve the durability of the dye-sensitized solar cell module. The present inventors have thus completed the invention.

In other words, the invention is a dye-sensitized photoelectric conversion element including at least one dye-sensitized photoelectric conversion cell, in which the dye-sensitized photoelectric conversion cell includes a conductive substrate having a transparent substrate and a transparent conductive layer provided on the transparent substrate, a counter substrate which faces the conductive substrate and includes a metal substrate, an oxide semiconductor layer provided on the conductive substrate or the counter substrate, an annular sealing portion bonding the conductive substrate and the counter substrate, a first connecting portion connecting one end of at least one wiring material and the metal substrate, and a portion to be connected which is connected to the other end of the wiring material, the first connecting portion contains first conductive particles, an inorganic filler, and a binder resin, the wiring material contains second conductive particles and a binder resin, the first conductive particles and the second conductive particles contain a common element, an average particle diameter of the first conductive particles is greater than an average particle diameter of the inorganic filler in the first connecting portion, and a content rate of the inorganic filler in the first connecting portion is greater than a content rate of the inorganic filler in the wiring material.

According to this dye-sensitized photoelectric conversion element, voids are less likely to be formed in the vicinity of the inorganic filler in the wiring material and it is possible to sufficiently suppress the occurrence of cracking of the wiring material taking the voids as the starting point and disconnection of the wiring material even if the wiring material expands and contracts in association with the temperature change since the content rate of the inorganic filler in the wiring material is smaller than the content rate of the inorganic filler in the first connecting portion. Meanwhile, the content rate of the inorganic filler can be increased in the first connecting portion and it is thus possible to improve the adhesive property between the first conductive particles and the metal substrate in the first connecting portion more than the adhesive property between the wiring material and the metal substrate and to sufficiently suppress peeling off of the first connecting portion from the metal substrate. Furthermore, it is possible to increase the contact area between the first conductive particles and the metal substrate by setting the average particle diameter of the first conductive particles to be greater than the average particle diameter of the inorganic filler in the first connecting portion and it is thus possible to sufficiently suppress a decrease in conductivity between the metal substrate and the first connecting portion even if a stress is applied to the first connecting portion in association with the temperature change. Furthermore, the adhesive force at the interface between the first connecting portion and the wiring material is improved so that peeling off between them is less likely to occur since the first conductive particles and the second conductive particles contain a common element. From the facts described above, it is possible to exhibit excellent durability according to the dye-sensitized photoelectric conversion element of the invention.

In the dye-sensitized photoelectric conversion element, it is preferable that the difference between the average particle diameter of the first conductive particles in the first connecting portion and the average particle diameter of the inorganic filler in the first connecting portion be from 0.5 to 5 μm.

In this case, the total volume of voids formed in the vicinity of the inorganic filler in the first connecting portion further increase and the adhesive property between the first connecting portion and the metal substrate is further improved as compared to a case in which the difference between the average particle diameter of the first conductive particles in the first connecting portion and the average particle diameter of the inorganic filler in the first connecting portion exceeds 5 μm. In addition, the contact area between the first conductive particles increases and the specific resistance of the first connecting portion further decreases as compared to a case in which the difference between the average particle diameter of the first conductive particles in the first connecting portion and the average particle diameter of the inorganic filler in the first connecting portion is less than 0.5 μm.

In the dye-sensitized photoelectric conversion element, it is preferable that the average particle diameter of the first conductive particles be from 0.02 to 10 μm.

In this case, it is possible to further decrease the resistance between the first connecting portion and the metal substrate as compared to a case in which the average particle diameter of the first conductive particles exceeds 10 μm. In addition, the voids in the first connecting portion further decrease and the specific resistance of the first connecting portion further decreases as compared to a case in which the average particle diameter of the first conductive particles is less than 0.02 μm.

In the dye-sensitized photoelectric conversion element, it is preferable that the content rate of the first conductive particles in the first connecting portion be from 60 to 95 mass %.

In this case, the ratio of the binder resin to the first conductive particles further increases and the adhesive property between the first connecting portion and the metal substrate is thus further improved as compared to a case in which the content rate of the first conductive particles in the first connecting portion exceeds 95 mass %. In addition, the contact area between the first conductive particles further increases and the specific resistance of the first connecting portion further decreases as compared to a case in which the content rate of the first conductive particles in the first connecting portion is less than 60 mass %.

In the dye-sensitized photoelectric conversion element, it is preferable that the content rate of the second conductive particles in the wiring material be from 50 to 95 mass %.

In this case, the ratio of the binder resin to the second conductive particles further increases and the adhesive property between the wiring material and the first connecting portion is thus further improved as compared to a case in which the content rate of the second conductive particles in the wiring material exceeds 95 mass %. In addition, the contact area between the second conductive particles further increases and the specific resistance of the wiring material further decreases as compared to a case in which the content rate of the second conductive particles in the wiring material is less than 50 mass %.

In the dye-sensitized photoelectric conversion element, it is preferable that the first conductive particles and the second conductive particles be identical metal particles.

In this case, the contact resistance between the first connecting portion and the wiring material further decreases since the first conductive particles and the second conductive particles are identical metal particles.

In the dye-sensitized photoelectric conversion element, it is preferable that the inorganic filler be a conductive material.

In this case, it is possible to further decrease the resistance between the first connecting portion and the metal substrate and to further improve the photoelectric conversion characteristics of the dye-sensitized photoelectric conversion element since the inorganic filler is a conductive material.

In the dye-sensitized photoelectric conversion element, it is preferable that the average particle diameter of the inorganic filler be from 0.01 to 2 μm.

In this case, it is possible to further decrease the resistance between the first connecting portion and the metal substrate as compared to a case in which the average particle diameter of the inorganic filler exceeds 2 μm. In addition, superior adhesive property is obtained between the metal substrate and the first connecting portion as compared to a case in which the average particle diameter of the inorganic filler is less than 0.01 μm.

In the dye-sensitized photoelectric conversion element, it is preferable that the content rate of the inorganic filler in the first connecting portion be from 0.1 to 6 mass %.

In this case, the contact area between the first conductive particles further increases and the specific resistance of the first connecting portion further decreases as compared to a case in which the content rate of the inorganic filler in the first connecting portion exceeds 6 mass %. In addition, the total volume of voids formed in the vicinity of the inorganic filler in the first connecting portion further increases and the adhesive property between the first connecting portion and the metal substrate is further improved as compared to a case in which the content rate of the inorganic filler in the first connecting portion is less than 0.1 mass %.

In the dye-sensitized photoelectric conversion element, it is preferable that the binder resin of the first connecting portion and the binder resin of the wiring material be constituted by at least one kind selected from the group consisting of a polyester resin and an epoxy resin.

In this case, it is possible to further enhance the adhesive property between the first connecting portion and the metal substrate and to more sufficiently suppress peeling off of the first connecting portion from the metal substrate as compared to a case in which the binder resin of the first connecting portion is constituted by a resin other than the resin described above. In addition, it is also possible to enhance the adhesive property between the first connecting portion and the wiring material and to more sufficiently suppress peeling off of the wiring material from the first connecting portion since the first connecting portion and the wiring material are both constituted by at least one kind selected from the group consisting of a polyester resin and an epoxy resin. Accordingly, the dye-sensitized photoelectric conversion element of the invention can have more excellent durability.

In the dye-sensitized photoelectric conversion element, it is preferable that the content rate of the inorganic filler in the wiring material be 0 mass %.

In this case, voids are less likely to be formed in the vicinity of the inorganic filler when the wiring material expands and contracts and it is possible to sufficiently suppress the occurrence of cracking of the wiring material taking the voids as the starting point as compared to a case in which the content rate of the inorganic filler in the wiring material is greater than 0 mass %.

In the dye-sensitized photoelectric conversion element, it is preferable that the difference between the content rate of the inorganic filler in the wiring material and the content rate of the inorganic filler in the first connecting portion be from 0.1 to 6 mass %.

In this case, the expansion and contraction rates of the wiring material and the first connecting portion are closer to each other and it is thus possible to effectively suppress the occurrence of peeling off at the interface between the wiring material and the first connecting portion as compared to a case in which the difference between the content rate of the inorganic filler in the wiring material and the content rate of the inorganic filler in the first connecting portion exceeds 6 mass %. In addition, it is possible to suppress both disconnection in the expansion and contraction portion caused when the expansion and contraction rates of the wiring material and the first connecting portion are close to each other and peeling off between the first connecting portion and the wiring material as compared to a case in which the difference between the content rates of the inorganic filler in the wiring material and the content rate of the inorganic filler in the first connecting portion is less than 0.1 mass %.

In the dye-sensitized photoelectric conversion element, it is preferable that the metal substrate be constituted by a metal capable of forming a passive state.

In this case, the dye-sensitized photoelectric conversion element of the invention can have more excellent durability since the metal substrate is less likely to be corroded by the electrolyte.

In the dye-sensitized photoelectric conversion element, it is preferable that the wiring material is in contact with the sealing portion and the first connecting portion is not in contact with the sealing portion in a case in which the sealing portion contains a resin.

The wiring material is likely to expand and contract since the content rate of the inorganic filler in the wiring material is smaller than that in the first connecting portion. Hence, the wiring material can follow expansion and contraction of the sealing portion so as to be less likely to be disconnected as only the wiring material is in contact with the sealing portion which is likely to expand and contract by a change in temperature but the first connecting portion is not in contact with the sealing portion. Hence, it is possible to suppress disconnection of the wiring material and the first connecting portion even if a sealing portion which is likely to expand and contract is used.

Incidentally, in the invention, the "average particle diameter" refers to the average particle diameter measured when a cross section of the first connecting portion or the wiring material is observed through a scanning electron microscope (SEM). Here, the average particle diameter measured by a SEM means the average value of the particle diameters calculated based on the following formula for the first conductive particles or the inorganic filler on the cross section of the first connecting portion or the wiring material observed through the SEM.

$$\text{Particle diameter} = (S/\pi)^{1/2}$$

(In the above formula, S represents the area of the first conductive particles or the inorganic filler)

Effect of the Invention

According to the invention, a dye-sensitized photoelectric conversion element having excellent durability is provided.

MODE(S) FOR CARRYING OUT THE INVENTION

Figure 1:
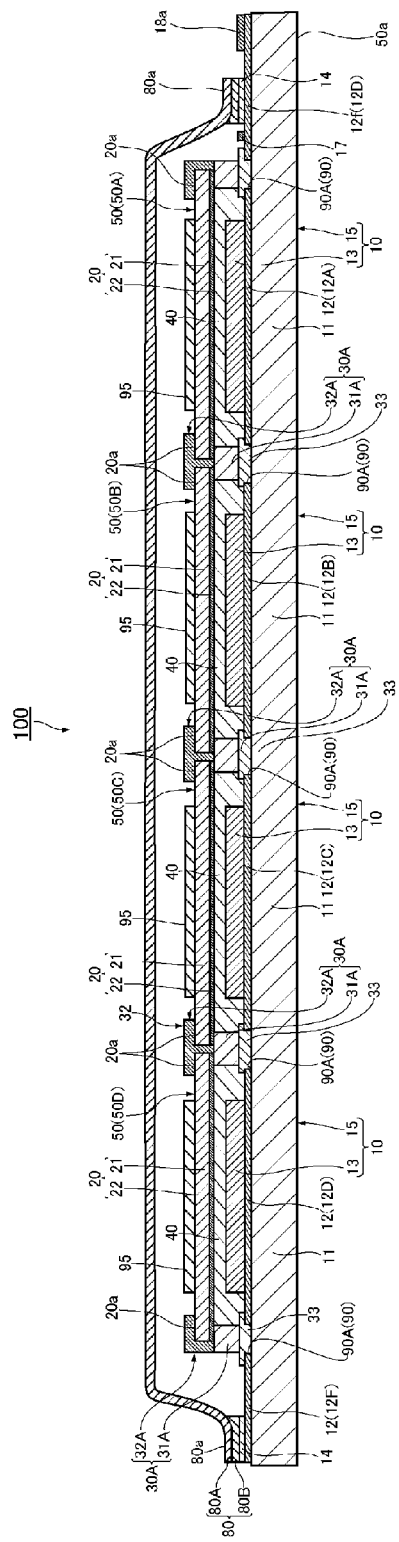
FIG. 1 is a cross-sectional view illustrating a first embodiment of a dye-sensitized photoelectric conversion element of the invention.
Figure 2:
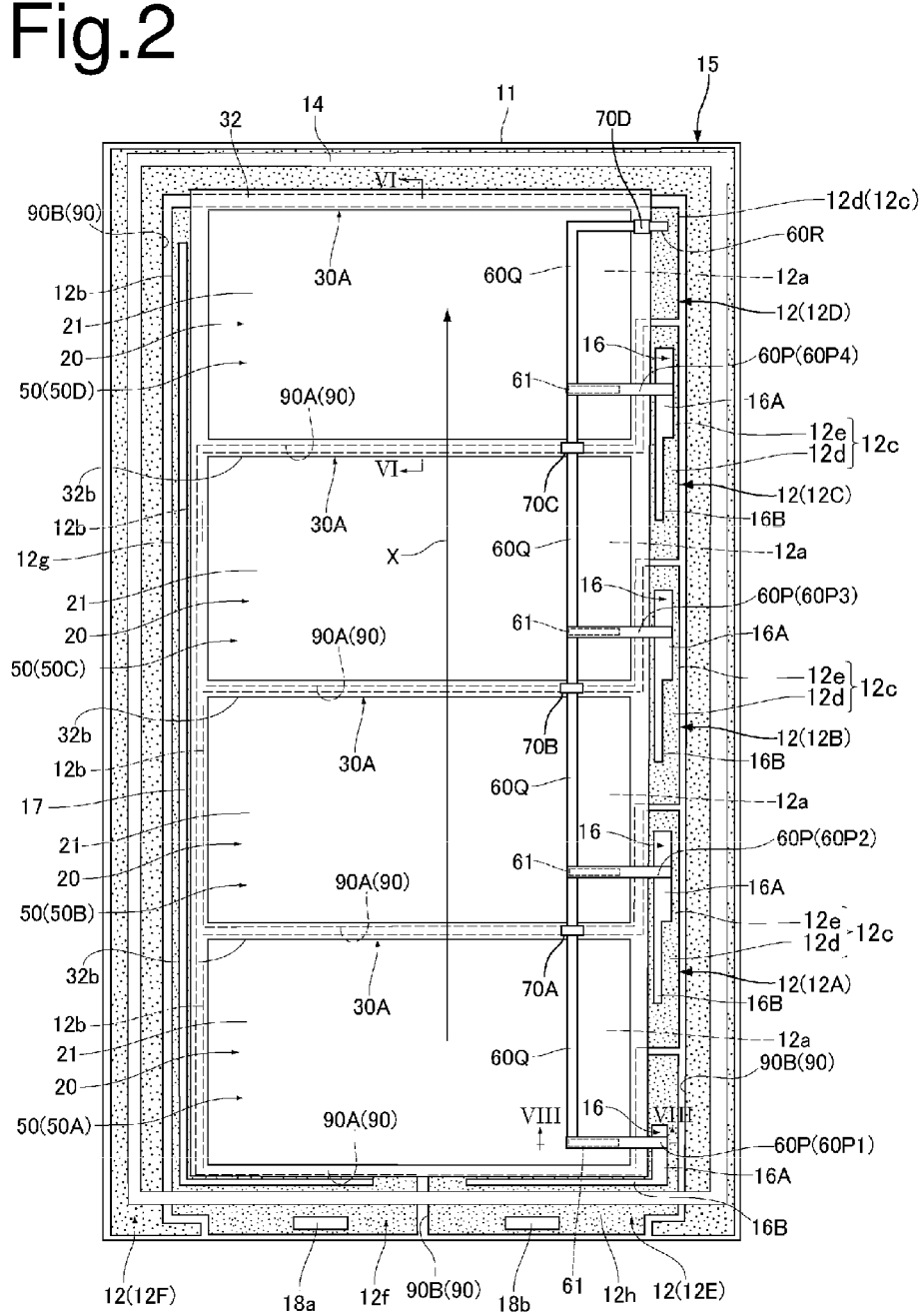
FIG. 2 is a plan view illustrating a portion of the first embodiment of the dye-sensitized photoelectric conversion element of the invention.
Figure 3:
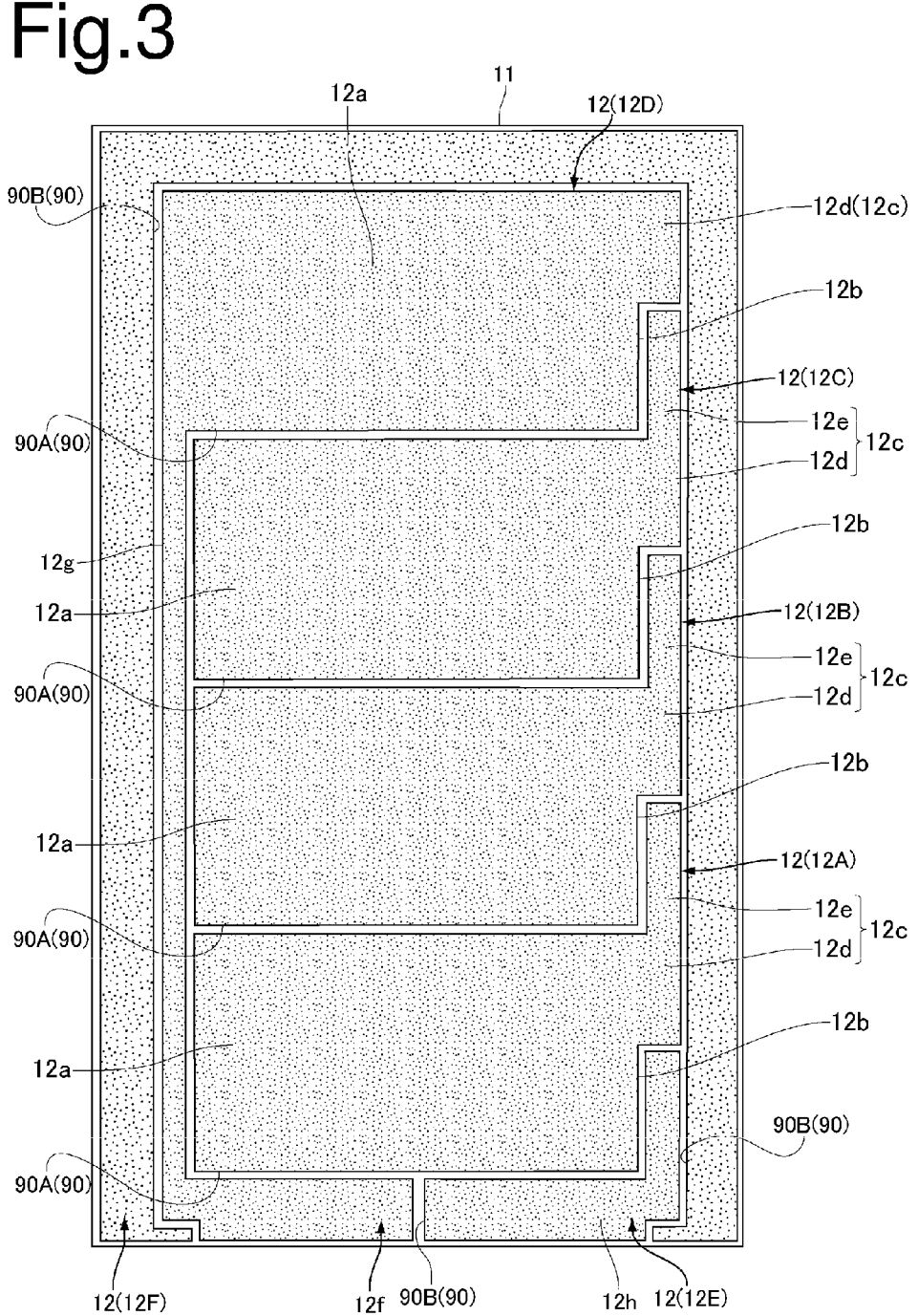
FIG. 3 is a plan view illustrating a pattern of a transparent conductive layer in the dye-sensitized photoelectric conversion element of FIG. 1.
Figure 4:
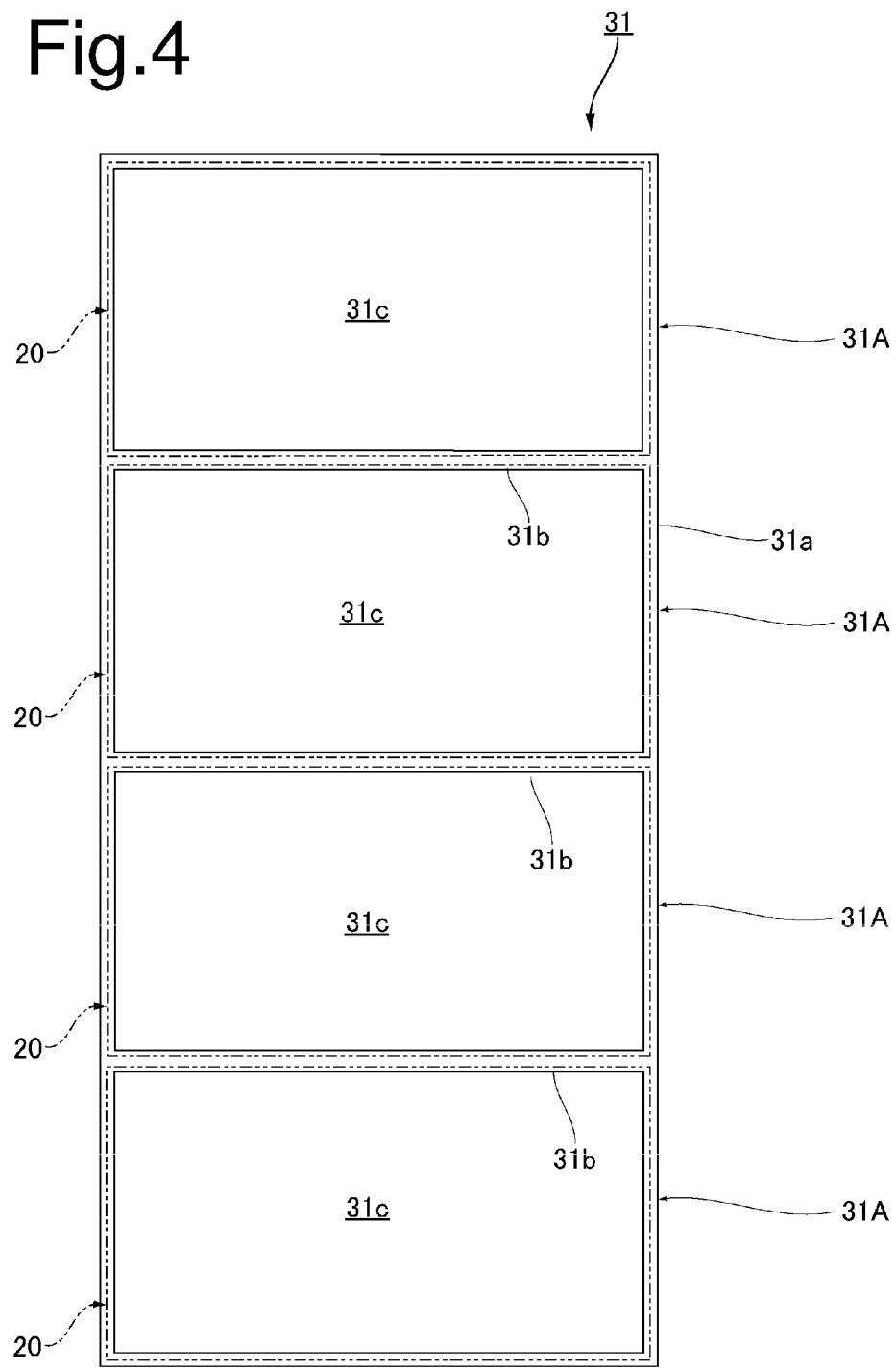
FIG. 4 is a plan view illustrating a first integrated sealing portion of FIG. 1.
Figure 5:
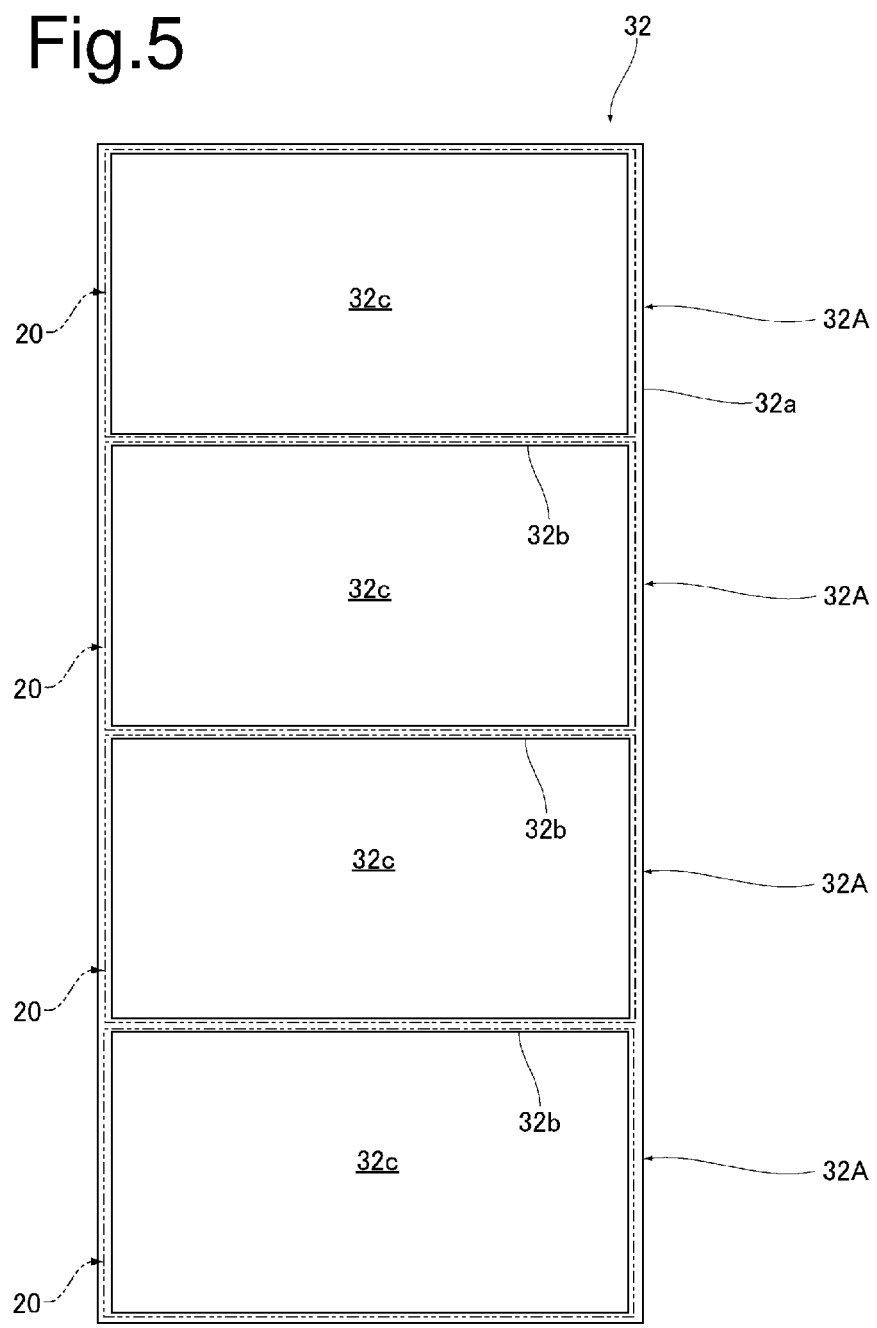
FIG. 5 is a plan view illustrating a second integrated sealing portion of FIG. 1.
Figure 6:
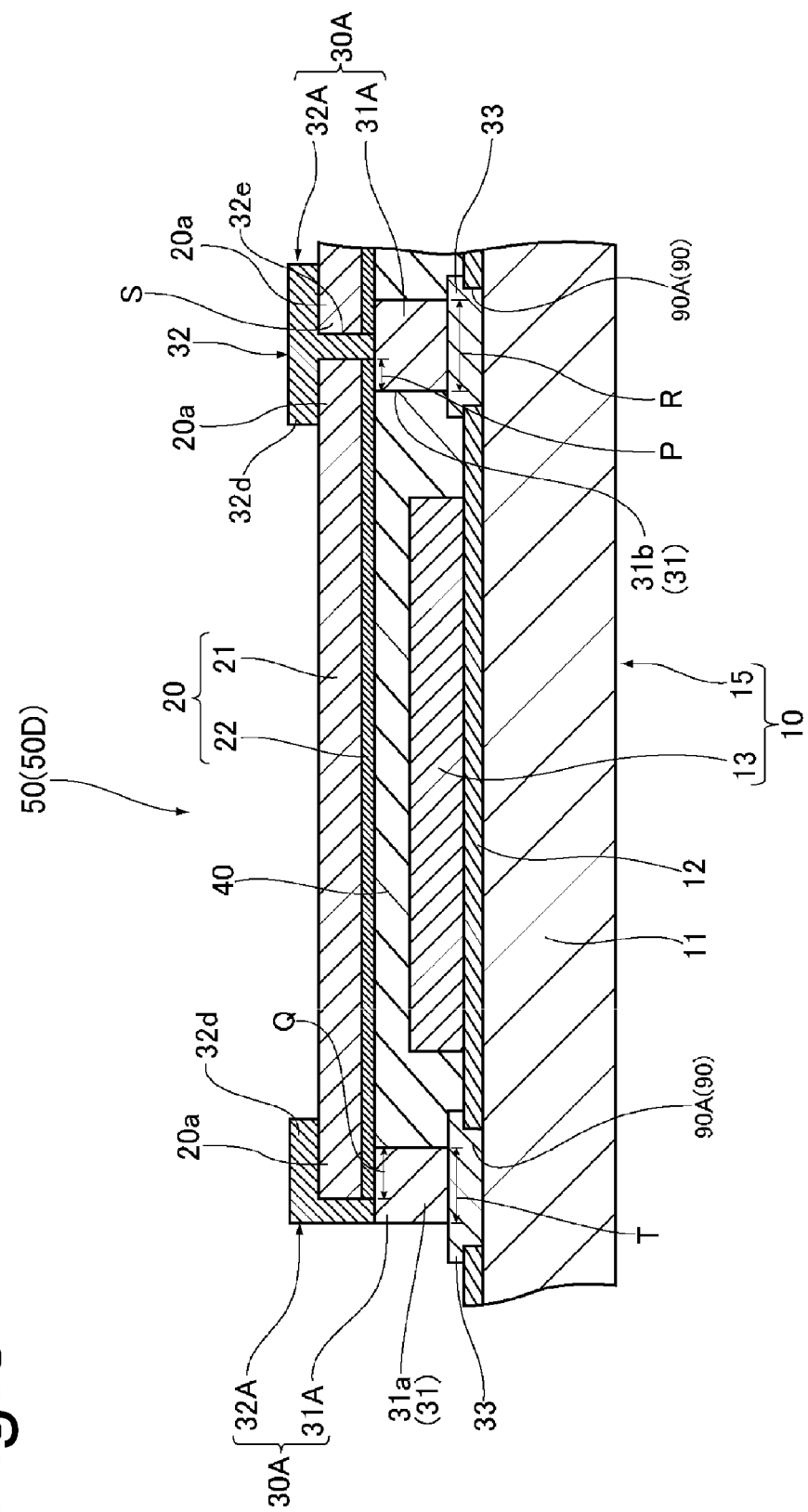
FIG. 6 is a cross-sectional view taken along the line VI-VI of FIG. 2.
Figure 7:
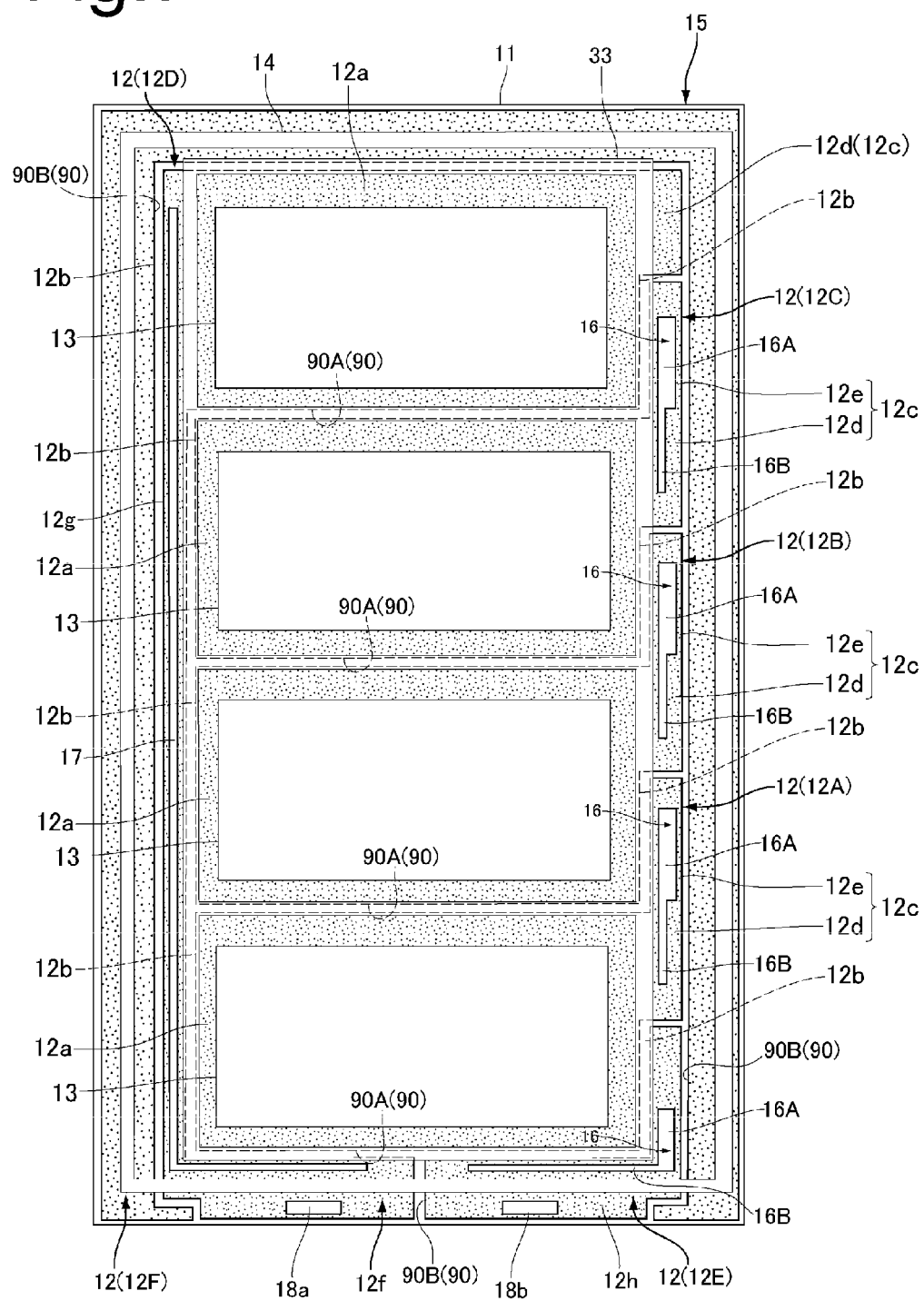
FIG. 7 is a plan view illustrating a working electrode on which a coupling portion for fixing a back sheet is formed.
Figure 8:
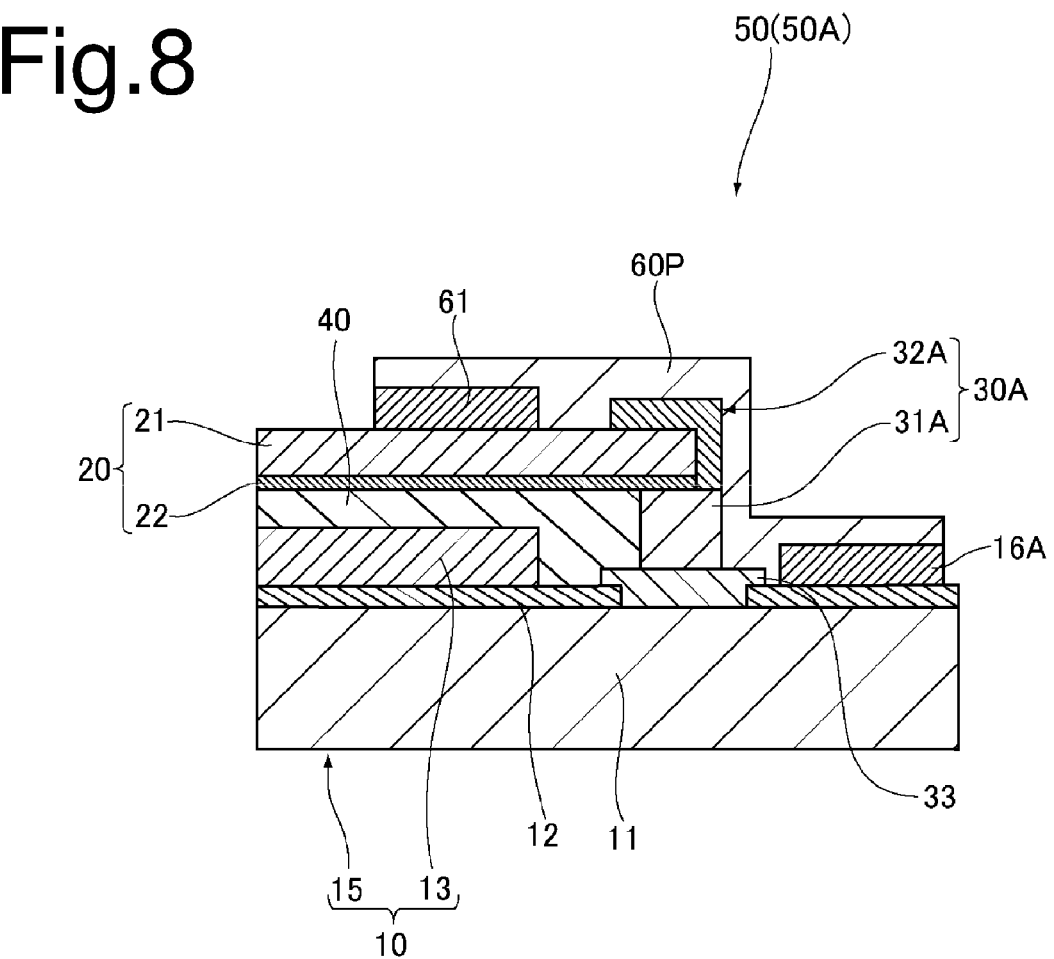
FIG. 8 is a partial cross-sectional view taken along the line VIII-VIII of FIG. 2.

Hereinafter, preferred embodiments of the dye-sensitized photoelectric conversion element of the invention will be described in detail with reference to FIG. 1 to FIG. 8. FIG. 1 is a cross-sectional view illustrating a preferred embodiment of a dye-sensitized photoelectric conversion element of the invention, FIG. 2 is a plan view illustrating a part of a preferred embodiment of a dye-sensitized photoelectric conversion element of the invention, FIG. 3 is a plan view illustrating a pattern of a transparent conductive layer of a dye-sensitized photoelectric conversion element of FIG. 1, FIG. 4 is a plan view illustrating a first integrated sealing portion of FIG. 1, FIG. 5 is a plan view illustrating a second integrated sealing portion of FIG. 1, FIG. 6 is a cross-sectional view taken along the line VI-VI of FIG. 2, FIG. 7 is a plan view illustrating a working electrode on which a coupling portion for fixing a back sheet is formed and FIG. 8 is a partial cross-sectional view taken along the line VIII-VIII of FIG. 2.

As illustrated in FIG. 1, a dye-sensitized photoelectric conversion element (hereinafter, referred to as the "Module" in some cases) 100 has a plurality (four in FIG. 1) of dye-sensitized photoelectric conversion cells (hereinafter, referred to as the "cell" in some cases) 50 and a back sheet 80 which is provided so as to cover a surface on the side opposite to a light incidence surface 50a of the cells. As illustrated in FIG. 2, the plurality of cells 50 are connected in series by a wiring material 60P. Hereinafter, for convenience of description, the four cells 50 in the module 100 are referred to as cells 50A to 50D in some cases.

As illustrated in FIG. 1, each of the plurality of cells 50 is equipped with a working electrode 10 having the conductive substrate 15, a counter electrode 20 facing the conductive substrate 15, and an annular sealing portion 30A bonding the conductive substrate 15 and the counter electrode 20. An electrolyte 40 is filled in the cell space formed by the conductive substrate 15, the counter electrode 20, and the annular sealing portion 30A.

The counter electrode 20 is equipped with a metal substrate 21 and a catalyst layer 22 which is provided at the working electrode 10 side of the metal substrate 21 and promotes the catalytic reaction. In addition, in two adjacent cells 50, the counter electrodes 20 are spaced apart from each other. In the present embodiment, a second electrode and a counter substrate are constituted by the counter electrode 20.

As illustrated in FIGS. 1 and 2, the working electrode 10 has the conductive substrate 15 and at least one oxide semiconductor layer 13 provided on the conductive substrate 15. The conductive substrate 15 has a transparent substrate 11, a transparent conductive layer 12 provided on the transparent substrate 11, an insulating material 33 provided on the transparent substrate 11 and composed of a glass frit, and a connecting terminal 16 provided on the transparent conductive layer 12. The oxide semiconductor layer 13 is arranged in an inner side of the annular sealing portion 30A. In addition, a photosensitizing dye is adsorbed on the oxide semiconductor layer 13.

The transparent substrate 11 is used as the common transparent substrate of the cells 50A to 50D. Meanwhile, in the present embodiment, a first electrode is constituted by the conductive substrate 15.

As illustrated in FIGS. 2 and 3, the transparent conductive layer 12 is configured by transparent conductive layers 12A to 12F which are provided in a state of being insulated from each other. Namely, the transparent conductive layers 12A to 12F are arranged to interpose a groove 90. Herein, the transparent conductive layers 12A to 12D constitute the transparent conductive layers 12 of a plurality of cells 50A to 50D, respectively. In addition, the transparent conductive layer 12E is arranged to be bent along the sealing portion 30A. The transparent conductive layer 12F is an annular transparent conductive layer 12 for fixing a peripheral edge portion 80a of the back sheet 80 (See FIG. 1).

As illustrated in FIG. 3, all of the transparent conductive layers 12A to 12D have a quadrangular-shaped main body portion 12a having a side edge portion 12b and a protruding portion 12c which laterally protrudes from the side edge portion 12b of the main body portion 12a.

As illustrated in FIG. 2, the protruding portion 12c of the transparent conductive layer 12C among the transparent conductive layers 12A to 12D has a projecting portion 12d which laterally projects with respect to the arrangement direction X of the cells 50A to 50D and a facing portion 12e which extends from the projecting portion 12d and faces the main body portion 12a of the adjacent cell 50D via the groove 90.

In the cell 50B as well, the protruding portion 12c of the transparent conductive layer 12B has the projecting portion 12d and the facing portion 12e. In addition, in the cell 50A as well, the protruding portion 12c of the transparent conductive layer 12A has the projecting portion 12d and the facing portion 12e.

Meanwhile, the cell 50D is connected with the cell 50C already and there is no other cell 50 to be connected. For this reason, in the cell 50D, the protruding portion 12c of the transparent conductive layer 12D does not have a facing portion 12e. In other words, the protruding portion 12c of the transparent conductive layer 12D is constituted by only the projecting portion 12d.

However, the transparent conductive layer 12D further has a first current extracting portion 12f for extracting the current generated in the module 100 to the outside and a connecting portion 12g which connects the first current extracting portion 12f with the main body portion 12a and extends along the side edge portion 12b of the transparent conductive layers 12A to 12C. The first current extracting portion 12f is disposed in the vicinity of the cell 50A and on the side opposite to the transparent conductive layer 12B with respect to the transparent conductive layer 12A.

On the other hand, the transparent conductive layer 12E also includes a second current extracting portion 12h for extracting the current generated by the module 100 to the outside, and the second current extracting portion 12h is arranged in the vicinity of the cell 50A and on the side opposite to the transparent conductive layer 12B with respect to the transparent conductive layer 12A. The first current extracting portion 12f and the second current extracting portion 12h are arranged to be adjacent to each other via the groove 90B (90) in the vicinity of the cell 50A. Herein, the groove 90 is configured by a first groove 90A which is formed along an edge portion of the main body portion 12a of the transparent conductive layer 12 and a second groove 90B which is formed along an edge portion of a portion of the transparent conductive layer 12 excluding the main body portion 12a and intersects the peripheral edge portion 80a of the back sheet 80.

In addition, connecting terminals 16 are provided on protrusion portions 12c of the transparent conductive layers 12A to 12C and the transparent conductive layer 12E. Each connecting terminal 16 includes a wiring material connecting portion 16A which is connected to the wiring material 60P and extends along the sealing portion 30A in the outer side of the sealing portion 30A and a wiring material non-connecting portion 16B which extends from the wiring material connecting portion 16A along the sealing portion 30A in the outer side of the sealing portion 30A. In the embodiment, in the transparent conductive layers 12A to 12C, at least the wiring material connecting portion 16A of the connecting terminal 16 is provided on the facing portion 12e of the protrusion portion 12c and faces the main body portion 12a of the connected adjacent cell 50. In the transparent conductive layer 12E, the wiring material connecting portion 16A of the connecting terminal 16 faces the main body portion 12a of the connected adjacent cell 50A. A width of the wiring material non-connecting portion 16B is narrower than that of the wiring material connecting portion 16A. Herein, the width of the wiring material connecting portion 16A and the width of the wiring material non-connecting portion 16B are set to be constant. In addition, the width of the wiring material connecting portion 16A denotes a length in the direction perpendicular to the extending direction of the wiring material connecting portion 16A and the narrowest width in the width of the wiring material connecting portion 16A, and the width of the wiring material non-connecting portion 16B denotes a length in the direction perpendicular to the extending direction of the wiring material non-connecting portion 16B and the narrowest width in the width of the wiring material non-connecting portion 16B.

Meanwhile, as illustrated in FIGS. 2 and 8, a conductive first connecting portion 61 is connected onto each of the metal substrates 21 of the cells 50A to 50D. In addition, four wiring materials 60P (hereinafter, respectively referred to as the wiring materials 60P1 to 60P4 in some cases) are provided on the sealing portion 30A side of the conductive substrate 15. Moreover, one end of the wiring material 60P1 is connected to the first connecting portion 61 connected onto the metal substrate 21 of the cell 50A and the other end of the wiring material 60P1 is connected to the wiring material connecting portion 16A of the connecting terminal 16 on the transparent conductive layer 12E. In the same manner, one end of the wiring material 60P2 is connected to the first connecting portion 61 connected onto the metal substrate 21 of the cell 50B and the other end of the wiring material 60P2 is connected to the wiring material connecting portion 16A of the connecting terminal 16 on the transparent conductive layer 12A. One end of the wiring material 60P3 is connected to the first connecting portion 61 connected onto the metal substrate 21 of the cell 50C and the other end of the wiring material 60P3 is connected to the wiring material connecting portion 16A of the connecting terminal 16 on the transparent conductive layer 12B. One end of the wiring material 60P4 is connected to the first connecting portion 61 connected onto the metal substrate 21 of the cell 50D and the other end of the wiring material 60P4 is connected to the wiring material connecting portion 16A of the connecting terminal 16 on the transparent conductive layer 12C. Moreover, in the present embodiment, the wiring material connecting portion 16A connected to the other ends of the wiring materials 60P1 to 60P4 constitutes the portion to be connected. In addition, the wiring materials 60P1 to 60P4 are both provided so as to pass over the sealing portion 30A containing a resin, that is, be in contact with the sealing portion 30A.

Here, the first connecting portion 61 is not in contact with the sealing portion 30A. In addition, the first connecting portion 61 contains first conductive particles, an inorganic filler, and a binder resin, the wiring material 61 contains second conductive particles and a binder resin, and the first conductive particles and the second conductive particles contain a common element. In addition, the average particle diameter of the first conductive particles is greater than the average particle diameter of the inorganic filler in the first connecting portion 61, and the content rate of the inorganic filler in the first connecting portion 61 is greater than the content rate of the inorganic filler in the wiring material 60P.

In addition, external connecting terminals 18a and 18b are provided on the first current extracting portion 12f and the second current extracting portion 12h, respectively.

As illustrated in FIG. 1, the sealing portion 30A, which contains a resin, has an annular first sealing portion 31A provided between the conductive substrate 15 and the counter electrode 20 and a second sealing portion 32A which is provided so as to be superimposed on the first sealing portion 31A and sandwiches an edge portion 20a of the counter electrode 20 together with the first sealing portion 31A. In addition, as illustrated in FIG. 4, the adjacent first sealing portions 31A are integrated so as to constitute a first integrated sealing portion 31. That is to say, the first integrated sealing portion 31 is constituted by an annular-shaped part 31a (hereinafter, referred to as the "annular portion") which is not provided between the two adjacent counter electrodes 20 and a part 31b (hereinafter, referred to as the "partitioning portion") which is provided between the two adjacent counter electrodes 20 and partitions an inner side opening 31c of the annular-shaped part 31a. In addition, as illustrated in FIG. 5, adjacent second sealing portions 32A are integrated between the adjacent counter electrodes 20 so as to constitute a second integrated sealing portion 32. The second integrated sealing portion 32 is constituted by an annular-shaped part 32a (hereinafter, referred to as the "annular portion") which is not provided between the two adjacent counter electrodes 20 and a part 32b (hereinafter, referred to as the "partitioning portion") which is provided between the two adjacent counter electrodes 20 and partitions an inner side opening 32c of the annular-shaped part 32a.

In addition, as illustrated in FIG. 1, between the first sealing portion 31A and the groove 90, an insulating material 33 composed of a glass frit is provided so as to enter into the groove 90 between the adjacent transparent conductive layers 12A to 12F and to spread over the adjacent transparent conductive layers 12. To describe in detail, the insulating material 33 also covers the edge portion of the main body portion 12 forming the first groove 90A as well as enters into the first groove 90A formed along the edge portion of the main body portion 12a of the transparent conductive layer 12 of the groove 90.

As illustrated in FIG. 6, the width P of the adhesive portion of the surface on the conductive substrate 15 side of the counter electrode 20 with the partitioning portion 31b of the first integrated sealing portion 31 is narrower than the width Q of the adhesive portion of the surface on the conductive substrate 15 side of the counter electrode 20 with the annular portion 31a of the first integrated sealing portion 31. Furthermore, the width R of the partitioning portion 31b of the first integrated sealing portion 31 is 100% or more and less than 200% of the width T of the annular portion 31a of the first integrated sealing portion 31.

In addition, the second integrated sealing portion 32 has a main body portion 32d provided on the side opposite to the working electrode 10 of the counter electrode 20 and an adhesive portion 32e provided between the adjacent counter electrodes 20. The second integrated sealing portion 32 is adhered to the first integrated sealing portion 31 by the adhesive portion 32e.

As illustrated in FIG. 1, the back sheet 80 is provided on the conductive substrate 15. The back sheet 80 includes a laminate 80A including a weather-resistant layer and a metal layer and an adhesive portion 80B which is provided on the side opposite to the metal layer with respect to the laminate 80A and adheres to the conductive substrate 15 via the coupling portion 14. Here, the adhesive portion 80B is provided in order to make the back sheet 80 adhere to the conductive substrate 15, and as illustrated in FIG. 1, the adhesive portion 80B may be formed on the peripheral portion of the laminate 80A. However, the adhesive portion 80B may be provided on the entire surface of the cell 50 side of the laminate 80A. The peripheral portion 80a of the back sheet 80 is connected with the transparent conductive layers 12D, 12E, and 12F among the transparent conductive layers 12 via the coupling portion 14 by the adhesive portion 80B. Here, the adhesive portion 80B is spaced apart from the sealing portion 30A of the cell 50. Moreover, the coupling portion 14 is also spaced apart from the sealing portion 30A. Meanwhile, the electrolyte 40 is not filled in the space which is on the inner side than the back sheet 80 and the outer side of the sealing portion 30A.

In addition, in the transparent conductive layer 12D, a current collecting wiring 17 having a lower resistance than the transparent conductive layer 12D extends so as to pass through the main body portion 12a, the connecting portion 12g, and the current extracting portion 12f. This current collecting wiring 17 is disposed so as not to intersect with the coupling portion 14 of the back sheet 80 with the conductive substrate 15. That is to say, the current collecting wiring 17 is disposed on the inner side than the coupling portion 14.

Meanwhile, as illustrated in FIG. 2, bypass diodes 70A to 70D are connected in parallel with the cells 50A to 50D, respectively. Specifically, the bypass diode 70A is fixed on the partitioning portion 32b of the second integrated sealing portion 32 between the cell 50A and the cell 50B, the bypass diode 70B is fixed on the partitioning portion 32b of the second integrated sealing portion 32 between the cell 50B and the cell 50C, and the bypass diode 70C is fixed on the partitioning portion 32b of the second integrated sealing portion 32 between the cell 50C and the cell 50D. The bypass diode 70D is fixed on the sealing portion 30A of the cell 50D. In addition, the wiring material 60Q is fixed to the metal substrate 21 of the counter electrode 20 so as to connect the bypass diodes 70A to 70D and the first connecting portion 61. Moreover, the bypass diode 70D is connected with the transparent conductive layer 12D via the wiring material 60R.

In addition, as illustrated in FIG. 1, a desiccant 95 is provided on the counter electrode 20 of each cell 50.

According to the module 100, voids are less likely to be formed in the vicinity of the inorganic filler in the wiring material 60P and it is possible to sufficiently suppress the occurrence of cracking of the wiring material 60P taking the voids as the starting point and disconnection of the wiring material 60P even if the wiring material 60P expands and contracts in association with the temperature change since the content rate of the inorganic filler in the wiring material 60P is smaller than the content rate of the inorganic filler in the first connecting portion 61. On the other hand, it is possible to set the content rate of the inorganic filler in the first connecting portion 61 to be great and it is thus possible to improve the adhesive property between the first conductive particles of the first connecting portion 61 and the metal substrate 21 more than the adhesive property between the wiring material 60P and the metal substrate 21 and to sufficiently suppress peeling off of the first connecting portion 61 from the metal substrate 21. Furthermore, it is possible to increase the contact area between the first conductive particles and the metal substrate 21 by setting the average particle diameter of the first conductive particles to be greater than the average particle diameter of the inorganic filler in the first connecting portion 61, and it is thus possible to sufficiently suppress peeling off of the first connecting portion 61 from the metal substrate 21 even if a stress is applied to the first connecting portion 61 in association with the temperature change. Furthermore, since the first conductive particles and the second conductive particles contain a common element, the adhesive force at the interface between the first connecting portion 61 and the wiring material 60P is thus improved and they are less likely to peel off. From the facts described above, it is possible to have more excellent durability according to the module 100.

In addition, in the module 100, the sealing portion 30A contains a resin, the wiring material 60P is in contact with the sealing portion 30A, and the first connecting portion 61 is not in contact with the sealing portion 30A. Here, the wiring material 60P is likely to expand and contract since the content rate of the inorganic filler in the wiring material 60P is smaller than that in the first connecting portion 61. Hence, the wiring material 60P can follow the expansion and contraction of the sealing portion 30A so as to be less likely to be disconnected as only the wiring material 60P is in contact with the sealing portion 30A which is likely to expand and contract by a change in temperature but the first connecting portion 61 is not in contact with the sealing portion 30A. Hence, it is possible to suppress disconnection of the wiring material 60P and the first connecting portion 61 even if the sealing portion 30A which is likely to expand and contract is used.

Furthermore, in the module 100, the groove 90 is formed along the edge portion of the transparent conductive layer 12, and this groove 90 has the first groove 90A formed along the edge portion of the main body portion 12a of the transparent conductive layer 12 disposed on the inner side of the annular sealing portion 30A. Moreover, the insulating material 33 composed of a glass frit enters into the first groove 90A, and also this insulating material 33 covers the edge portion of the main body portion 12a forming the first groove 90A as well. For this reason, even if a crack is formed inside the transparent substrate 11 and at the position downward the groove 90 along the groove 90 and the crack continues to the edge portion of the main body portion 12a, the penetration of moisture, which has passed through the crack, from the outside of the sealing portion 30A is sufficiently suppressed by the insulating material 33. Particularly, in the module 100, the insulating material 33 which covers the edge portion of the main body portion 12a forming the first groove 90A and enters into the first groove 90A is composed of a glass frit. For this reason, the insulating material has a higher sealing performance compared to a case in which the insulating material 33 is a resin. For this reason, according to the module 100, it is possible to have excellent durability.

In addition, in the module 100, the sealing portion 30A and the insulating material 33 are disposed so as to be superimposed on each other. For this reason, it is possible to further increase the area of the part contributing to the power generation when seen from the light receiving surface side of the module 100 compared to a case in which the insulating material 33 is disposed so as not to be superimposed on the sealing portion 30A. For this reason, it is possible to more improve the aperture ratio.

In addition, in the module 100, the first current extracting portion 12f and the second current extracting portion 12h are disposed in the vicinity of the cell 50A and on the side opposite to the transparent conductive layer 12B with respect to the transparent conductive layer 12A, and the first current extracting portion 12f of the transparent conductive layer 12A and the second current extracting portion 12h of the transparent conductive layer 12F are disposed so as to be adjacent to each other via the groove 90. For this reason, in the module 100, it is possible to dispose the external connecting terminals 18a and 18b to the first current extracting portion 12f and the second current extracting portion 12h, respectively, so as to be adjacent to each other. Hence, it is possible to set the number of connectors for extracting the current from the external connecting terminals 18a and 18b to the outside to one. In other words, since the first current extracting portion 12f and the second current extracting portion 12h are disposed to be greatly spaced apart from each other, for example, in a case in which the first current extracting portion 12f is disposed on the side opposite to the transparent conductive layer 12c with respect to the transparent conductive layer 12D, the external connecting terminals 18a and 18b are disposed to be greatly spaced apart from each other as well. In this case, two connectors of a connector to be connected with the external connecting terminal 18a and a connector to be connected with the external connecting terminal 18b are required in order to extract the current from the module 100. However, according to the module 100, it is possible to dispose the external connecting terminals 18a and 18b so as to be adjacent to each other, and thus only one connector is required. For this reason, according to the module 100, it is possible to achieve space saving. In addition, the generated current is low in the module 100 when the module 100 is used under a low illuminance. Specifically, the generated current is 2 mA or lower. For this reason, it is possible to sufficiently suppress the deterioration of the photoelectric conversion performance of the module 100 even if a part of the transparent conductive layer 12D of the cell 50D on one end side of the cell 50A and cell 50D at both ends of the cells 50A to 50D is disposed next to the second current extracting portion 12h which is electrically connected with the metal substrate 21 of the counter electrode 20 of the cell 50A on the other end side via the groove 90 as the first current extracting portion 12f.

In addition, in the module 100, the cells 50A to 50D are arranged in a line along the X direction, the transparent conductive layer 12D of the cell 50D on one end side of the cell 50A and cell 50D at both ends of the cells 50A to 50D has the main body portion 12a provided on the inner side of the sealing portion 30A, the first current extracting portion 12f, and the connecting portion 12g which connects the main body portion 12a with the first current extracting portion 12f. For this reason, it is possible to more shorten the installation region of the connecting terminal 16 provided along the arrangement direction (X direction in FIG. 2) of the cells 50A to 50D in order to connect two adjacent cells 50 compared to a case in which the cells 50C and 50D of a part of the cells 50A to 50D are folded back in the middle and the cell 50A and the cell 50D are disposed so as to be adjacent to each other, and thus it is possible to achieve space saving to a greater extent. Furthermore, according to the module 100, the generated current is usually low in a case in which the module 100 is used in a low illuminance environment. For this reason, it is possible to sufficiently suppress the deterioration of the photoelectric conversion characteristics although the module 100 further has the connecting portion 12g which connects the main body portion 12a with the first current extracting portion 12f.

In addition, in the module 100, the current collecting wiring 17 is arranged so as not to intersect the coupling portion 14 between the back sheet 80 and the conductive substrate 15. Since the current collecting wiring 17 is generally porous, the current collecting wiring has gas permeability, and thus, gases such as water vapor are permeable. When the current collecting wiring 17 is arranged so as not to intersect the coupling portion 14 between the back sheet 80 and the conductive substrate 15, the infiltration of water vapor or the like from the outside through the current collecting wiring 17 into the space between the back sheet 80 and the conductive substrate 15 can be prevented. As a result, the module 100 can have excellent durability. In addition, since the resistance of the current collecting wiring 17 is lower than that of the transparent conductive layer 12D, even when a generating current becomes large, a deterioration in photoelectric conversion characteristics can be sufficiently suppressed.

Furthermore, the connecting terminal 16 is less likely to peel off from the protruding portion 12c of the transparent conductive layer 12 as the width of the connecting terminal 16 is narrower in a case in which the module 100 is placed in an environment in which the temperature change is great. With regard to that point, in the module 100, the wiring material non-connecting portion 16B of the connecting terminal 16 has a narrower width than the wiring material connecting portion 16A connected with the wiring material 60P. For this reason, the wiring material non-connecting portion 16B of the connecting terminals 16 is less likely to peel off from the protruding portion 12c of the transparent conductive layer 12. Hence, the wiring material non-connecting portion 16B does not peel off from the transparent conductive layer 12 and thus it is possible to maintain the connection with the transparent conductive layer 12 even if the wiring material connecting portion 16A peels off from the protruding portion 12c of the transparent conductive layer 12. Furthermore, it is possible to normally operate the module 100 even if the wiring material connecting portion 16A peels off from the protruding portion 12c of the transparent conductive layer 12. Consequently, according to the module 100, it is possible to improve the connection reliability. In addition, the wiring material 60P connected with the metal substrate 21 of the counter electrode 20 of one cell 50 of two adjacent cells 50 is connected with the wiring material connecting portion 16A on the protruding portion 12c of the other cell 50, and the wiring material connecting portion 16A is provided on the protruding portion 12c and the outer side of the sealing portion 30A. In other words, the connection of two adjacent cells 50 is performed on the outer side of the sealing portion 30A. For this reason, according to the module 100, it is possible to improve the aperture ratio.

In addition, in the module 100, in the cell 50 that is connected with the adjacent cell 50 among the cells 50A to 50D, the protruding portion 12c has the projecting portion 12d which laterally projects from the main body portion 12a and the facing portion 12e which extends from the projecting portion 12d and faces the main body portion 12a of the adjacent cell 50, and at least the wiring material connecting portion 16A of the connecting terminal 16 is provided on the facing portion 12e.

In this case, since at least the wiring material connecting portion 16A of the connecting terminal 16 is provided on the facing portion 12e facing the main body portion 12a of the adjacent cell 50, it is possible to sufficiently prevent the wiring material 60P connected with the wiring material connecting portion 16A from passing over the metal substrate 21 of the counter electrode 20 of the adjacent cell 50 unlike the case in which at least the wiring material connecting portion 16A of the connecting terminal 16 is not provided on the facing portion 12e facing the main body portion 12a of the adjacent cell 50. As a result, it is possible to sufficiently prevent the short circuit between the adjacent cells 50.

In addition, in the module 100, both of the wiring material connecting portion 16A and the wiring material non-connecting portion 16B are disposed along the sealing portion 30A. For this reason, it is possible to save the space required for the connecting terminal 16 compared to the case of disposing the wiring material connecting portion 16A and the wiring material non-connecting portion 16B in the direction away from the sealing portion 30A.

Furthermore, in the module 100, the adhesive portion 80B of the back sheet 80 is spaced apart from the sealing portion 30A of the cell 50. For this reason, it is sufficiently suppressed that the sealing portion 30A is stretched since the adhesive portion 80B is constricted at a low temperature and thus an excessive stress is applied to the interface between the sealing portion 30A and the conductive substrate 15 or the counter electrode 20. In addition, at a high temperature as well, it is sufficiently suppressed that the sealing portion 30A is pressed since the adhesive portion 80B expands and thus an excessive stress is applied to the interface between the sealing portion 30A and the conductive substrate 15 or the counter electrode 20. In other words, it is sufficiently suppressed that an excessive stress is applied to the interface between the sealing portion 30A and the conductive substrate 15 or the counter electrode 20 both at a high temperature and a low temperature. For this reason, it is possible for the module 100 to have excellent durability.

Furthermore, in the module 100, the width P of the adhesive portion of the surface on the conductive substrate 15 side of the counter electrode 20 with the partitioning portion 31b of the first integrated sealing portion 31 is narrower than the width Q of the adhesive portion of the surface on the conductive substrate 15 side of the counter electrode 20 with the annular portion 31a of the first integrated sealing portion 31. For this reason, it is possible to more sufficiently improve the aperture ratio of the module 100. In addition, in the module 100, the adjacent first sealing portions 31A are integrated between the adjacent counter electrodes 20 and the adjacent second sealing portions 32A are integrated between the adjacent counter electrodes 20. Here, the sealing portion exposed to the atmosphere is in two places in between the adjacent cells 50 if the adjacent first sealing portions 31A are not integrated. In contrast to this, in the module 100, the sealing portion exposed to the atmosphere is in one place in between the adjacent cells 50 since the adjacent first sealing portions 31A are integrated. In other words, the sealing portion exposed to the atmosphere is in only one place of the partitioning portion 31b in between the adjacent cells 50 since the first integrated sealing portion 31 is constituted by the annular portion 31a and the partitioning portion 31b. In addition, the penetration distance of moisture or the like from the atmosphere to the electrolyte 40 extends since the first sealing portions 31A are integrated. For this reason, it is possible to sufficiently reduce the amount of moisture or air penetrating from the outside of the cell 50 in between the adjacent cells 50. In other words, it is possible to sufficiently improve the sealing ability of the module 100. In addition, according to the module 100, the adjacent first sealing portions 31A are integrated. For this reason, it is possible to secure a sufficient sealing width at the partitioning portion 31b even if the width P of the adhesive portion of the surface on the conductive substrate 15 side of the counter electrode 20 with the partitioning portion 31b of the first integrated sealing portion 31 is narrower than the width Q of the adhesive portion of the surface on the conductive substrate 15 side of the counter electrode 20 with the annular portion 31a of the first integrated sealing portion 31. In other words, according to the module 100, it is possible to sufficiently increase the bonding strength of the first sealing portion 31A with the conductive substrate 15 and the bonding strength of the first sealing portion 31A with the counter electrode 20 while improving the aperture ratio. As a result, it is possible to improve the aperture ratio as well as it is possible to sufficiently suppress the peeling of the first sealing portion 31A from the conductive substrate 15 and the counter electrode 20 even if the electrolyte 40 expands and thus an excessive stress directed from the inner side to the outer side of the first sealing portion 31A is applied in the case of using the module 100 under a high temperature, and thus it is possible to have excellent durability.

Furthermore, in the module 100, the width R of the partitioning portion 31b of the first integrated sealing portion 31 is 100% or more and less than 200% of the width T of the annular portion 31a of the first integrated sealing portion 31. In this case, since the width R of the partitioning portion 31b is 100% or more of the width T of the annular portion 31a in the partitioning portion 31b of the first integrated sealing portion 31, the penetration distance of moisture or the like from the atmosphere to the electrolyte 40 extends compared to a case in which the width R of the partitioning portion 31b is less than 100% of the width T of the annular portion 31a in the partitioning portion 31b of the first integrated sealing portion 31. For this reason, it is possible to more sufficiently suppress that the moisture penetrates from the outside through the partitioning portion 31b present between the adjacent cells 50. On the other hand, it is possible to more improve the aperture ratio compared to a case in which the width R of the partitioning portion 31b exceeds 200% of the width T of the annular portion 31a.

In addition, in the module 100, the second sealing portion 32A is adhered to the first sealing portion 31A, and the edge portion 20a of the counter electrode 20 is sandwiched by the first sealing portion 31A and the second sealing portion 32A. For this reason, the peeling is sufficiently suppressed by the second sealing portion 32A even if the stress in the direction away from the working electrode 10 with respect to the counter electrode 20 is applied. In addition, since the partitioning portion 32b of the second integrated sealing portion 32 is adhered to the first sealing portion 31A through the gap S between the adjacent counter electrodes 20, it is reliably prevented that the counter electrodes 20 of the adjacent cells 50 come in contact with each other.

Next, the working electrode 10, the coupling portion 14, the photosensitizing dye, the counter electrode 20, the sealing portion 30A, the electrolyte 40, the first connecting portion 61, the wiring materials 60P and 60Q, the back sheet 80, and the desiccant 95 will be described in detail.

(Working Electrode)

The material constituting the transparent substrate 11 may be any transparent material, for example, and examples of such a transparent material may include glass such as borosilicate glass, soda lime glass, glass which is made of soda lime and whose iron component is less than that of ordinary soda lime glass, and quartz glass, polyethylene terephthalate (PET), polyethylene naphthalate (PEN), polycarbonate (PC), and polyethersulfone (PES). The thickness of the transparent substrate 11 is appropriately determined depending on the size of the module 100 and is not particularly limited, but it may be set into the range of from 50 to 10000 μm, for example.

Examples of the material contained in the transparent conductive layer 12 may include a conductive metal oxide such as indium-tin-oxide (ITO), tin oxide ($SnO_2$), and fluorine-doped-tin-oxide (FTC)). The transparent conductive layer 12 may be constituted by a single layer or a laminate consisting of a plurality of layers containing different conductive metal oxides. It is preferable that the transparent conductive layer 12 contain FTO since FTO has high heat resistance and chemical resistance in a case in which the transparent conductive layer 12 is constituted by a single layer. The transparent conductive layer 12 may further contain a glass frit. The thickness of the transparent conductive layer 12 may be set into the range of from 0.01 to 2 μm, for example.

In addition, the resistance value of the connecting portion 12g of the transparent conductive layer 12D of the transparent conductive layer 12 is not particularly limited but is preferably equal to or less than the resistance value represented by the following Equation (1).

$$\text{Resistance value} = \text{number of cells 50 connected in series} \times 120\ \Omega \quad (1)$$

In this case, it is possible to sufficiently suppress the deterioration of the performance of the module 100 compared to a case in which the resistance value of the connecting portion 12g exceeds the resistance value represented by Equation (1) above. In the present embodiment, since the number of cells 50 is 4, the resistance value represented by Equation (1) above becomes 480Ω. Accordingly, the resistance value of the connecting portion 12g is preferably 480Ω or less.

The insulating material 33 is composed of a glass frit in the present embodiment. The thickness of the insulating material 33 is usually from 10 to 30 μm and preferably from 15 to 25 μm. In addition, the width that the insulating material 33 covers the edge portion of the transparent conductive layer 12 is preferably 0.2 mm or more and more preferably 0.5 mm or more. It is possible to sufficiently secure the insulation properties between the transparent conductive layers 12 of the adjacent DSCs 50 by setting the width covering the edge portion of the transparent conductive layer 12 to 0.2 mm or more. However, the width that the insulating material 33 covers the edge portion of the transparent conductive layer 12 is preferably 5 mm or less.

The connecting terminal 16 contains a metallic material. Examples of the metallic material may include silver, copper and indium. These may be used singly or in combination of two or more kinds thereof.

In addition, the connecting terminal 16 may be constituted by the same material as or a different material from the wiring material 60P but it is preferable to be constituted by the same material.

In this case, it is possible to more sufficiently improve the adhesive property of the connecting terminal 16 with the wiring material 60P since the connecting terminal 16 and the wiring material 60P are constituted by the same material. For this reason, it is possible to more improve the connection reliability of the module 100.

In the connecting terminal 16, the width of the wiring material non-connecting portion 16B is not particularly limited as long as it is narrower than the width of the wiring material connecting portion 16A, but it is preferable to be equal to or less than ½ of the width of the wiring material connecting portion 16A.

In this case, it is possible to more improve the connection reliability of the module 100 compared to a case in which the width of the wiring material non-connecting portion 16B exceeds ½ of the width of the wiring material connecting portion 16A.

The width of the wiring material connecting portion 16A is not particularly limited but is preferably from 0.5 to 5 mm and more preferably from 0.8 to 2 mm.

The oxide semiconductor layer 13 typically contains a titanium oxide.

Meanwhile, the oxide semiconductor layer 13 may be configured with oxide semiconductor particles other than the titanium oxide. As the oxide semiconductor particle, silicon oxide ($SiO_2$), zinc oxide (ZnO), tungsten oxide ($WO_3$), niobium oxide ($Nb_2O_5$), strontium titanate ($SrTiO_3$), tin oxide ($SnO_2$), indium oxide ($In_3O_3$), zirconium oxide ($ZrO_2$), thallium oxide ($Ta_2O_5$), lanthanum oxide ($La_2O_3$), yttrium oxide ($Y_2O_3$), holmium oxide ($HO_2O_3$), bismuth oxide ($Bi_2O_3$), cerium oxide ($CeO_2$), and aluminum oxide ($Al_2O_3$) can be exemplified.

The oxide semiconductor layer 13 is usually constituted by an absorbing layer for absorbing light, but may be constituted by an absorbing layer and a reflective layer to return the light that is transmitted through the absorbing layer to the absorbing layer by reflecting the light.

The thickness of the oxide semiconductor layer 13 is typically in a range of 0.5 to 50 μm, preferably in a range of 5 to 35 μm. In this case, in comparison with a case where the thickness is less than 5 μm, it is possible to sufficiently suppress the phenomenon that the periphery of the oxide semiconductor layer 13 is seen bright by reflected light or scattered light from the oxide semiconductor layer 13 in a case where the DSC module 100 is seen from the conductive substrate 15 side. On the other hand, if the thickness is in a range of 5 to 35 μm, in comparison with a case where the thickness exceeds 35 μm, it is possible to sufficiently suppress peeling of the oxide semiconductor layer 13 from the transparent conductive layer 12 or occurrence of a crack in the oxide semiconductor layer 13.

(Coupling Portion)

The material constituting the coupling portion 14 is not particularly limited as long as it can make the back sheet 80 and transparent conductive layer 12 adhere to each other, and it is possible to use, for example, a glass frit, a resin material which is the same as the resin material used for the sealing portion 31A, or the like as the material constituting the coupling portion 14. Among them, the coupling portion 14 is preferably a glass frit. It is possible to effectively suppress the penetration of moisture or the like from the outside of the back sheet 80 since the glass frit has higher sealing ability than the resin material.

(Photosensitizing Dye)

Examples of the photosensitizing dye may include a ruthenium complex having a ligand containing a bipyridine structure, terpyridine structure or the like, or an organic dye such as porphyrin, eosin, rhodamine, or merocyanine.

(Counter Electrode)

As described above, the counter electrode 20 is equipped with the metal substrate 21 and the conductive catalyst layer 22 which is provided on the working electrode 10 side of the metal substrate 21 and promotes the reduction reaction on the surface of the counter electrode 20.

The metal substrate 21 may be constituted by a metal, but this metal is preferably a metal capable of forming a passive state. In this case, the metal substrate 21 is less likely to be corroded by the electrolyte 40 and the module 100 can thus have superior durability. Examples of the metal capable of forming a passive state may include titanium, nickel, molybdenum, tungsten, aluminum, stainless steel, or alloys thereof. The thickness of the metal substrate 21 is appropriately determined according to the size of the module 100, and it is not particularly limited, but it may be set to, for example, from 0.005 to 0.1 mm.

The catalyst layer 22 is constituted by platinum, a carbon-based material, or a conductive polymer. Here, a carbon black or a carbon nanotube is suitably used as the carbon-based material.

(Sealing Portion)

The sealing portion 30A is constituted by the first sealing portion 31A and the second sealing portion 32A.

Examples of the material constituting the first sealing portion 31A may include a resin such as a modified polyolefin resin including an ionomer, an ethylene-vinyl acetic anhydride copolymer, an ethylene-methacrylic acid copolymer, an ethylene-vinyl alcohol copolymer and the like, an ultraviolet-cured resin, and vinyl alcohol polymer.

The thickness of the first sealing portion 31A is usually from 40 to 90 μm and preferably from 60 to 80 μm.

The width P of the adhesive portion of the counter electrode 20 with the partitioning portion 31b is 25% or more and less than 100% of the width Q of the adhesive portion of the counter electrode 20 with the annular portion 31a of the first integrated sealing portion 31. In this case, it is possible to have more excellent durability compared to a case in which the width P of the adhesive portion is less than 25% of the width Q of the adhesive portion. The width P of the adhesive portion is more preferably 30% or more and even more preferably 40% or more of the width Q of the adhesive portion.

In the module 100, the width R of the partitioning portion 31b of the first integrated sealing portion 31 is preferably 100% or more and less than 200% and more preferably from 120 to 180% of the width T of the annular portion 31a of the first integrated sealing portion 31.

In this case, it is possible to balance a great aperture ratio with excellent durability.

Examples of the material constituting the second sealing portion 32A may include a resin such as a modified polyolefin resin including an ionomer, an ethylene-vinyl acetic anhydride copolymer, an ethylene-methacrylic acid copolymer, and an ethylene-vinyl alcohol copolymer, an ultraviolet-cured resin, or a vinyl alcohol polymer in the same manner as the first sealing portion 31A. The material constituting the second sealing portion 32A may be identical to or different from the material constituting the first sealing portion 31A. In a case in which the material constituting the second sealing portion 32A is identical to the material constituting the first sealing portion 31A, the interface between the second sealing portion 32A and the first sealing portion 31A is eliminated. For this reason, it is possible to effectively suppress penetration of moisture from the outside and leakage of the electrolyte 40. In a case in which the constituent material of the sealing resin film for forming the second integrated sealing portion 32 is different from the constituent material of the sealing resin film for forming the first integrated sealing portion 31, for example, in a case in which the constituent material of the sealing resin film for forming the second integrated sealing portion 32 has a higher melting point than the constituent material of the sealing resin film for forming the first integrated sealing portion 31, the second sealing portion 32A is harder than the first sealing portion 31 A, and it is hence possible to effectively prevent contact between the counter electrodes 20 of adjacent cells 50. In addition, it is possible to effectively mitigate the stress applied to the sealing portion 30A since the first sealing portion 31A is softer than the second sealing portion 32A.

The thickness of the second sealing portion 32A is usually from 20 to 45 μm and preferably from 30 to 40 μm.

(Electrolyte)

The electrolyte 40 contains, for example, a redox couple such as $I^-/I_3^-$ and an organic solvent. It is possible to use acetonitrile, methoxy acetonitrile, methoxy propionitrile, propionitrile, ethylene carbonate, propylene carbonate, diethyl carbonate, γ-butyrolactone, valeronitrile, pivalonitrile, glutaronitrile, methacrylonitrile, isobutyronitrile, phenyl acetonitrile, acrylonitrile, succinonitrile, oxalonitrile, pentanenitrile, and adiponitrile as the organic solvent. Examples of the redox couple may include a redox couple such as bromine/bromide ion, a zinc complex, an iron complex, and a cobalt complex in addition to $I^-/I_3^-$.

In addition, the electrolyte 40 may use an ionic liquid instead of the organic solvent. As the ionic liquid, it is possible to use, for example, an ordinary temperature molten salt which is a known iodine salt, such as a pyridinium salt, an imidazolium salt, and a triazolium salt, and which is in a molten state at around room temperature. As such an ordinary temperature molten salt, it is possible to suitably use, for example, 1-hexyl-3-methylimidazolium iodide, 1-ethyl-3-propylimidazolium iodide, dimethylimidazolium iodide, 1-ethyl-3-methylimidazolium iodide, 1,2-dimethyl-3-propylimidazolium iodide, 1-butylmethylimidazolium bromide, or 1-methyl-3-propylimidazolium bromide.

In addition, the electrolyte 40 may use a mixture of the ionic liquid above and the organic solvent above instead of the organic solvent above.

In addition, it is possible to add an additive to the electrolyte 40. Examples of the additive may include LiI, $I_2$, 4-t-butylpyridine, guanidinium thiocyanate, 1-methylbenzimidazole, and 1-butylbenzimidazole.

Moreover, as the electrolyte 40, a nanocomposite gel electrolyte which is a quasi-solid electrolyte obtained by kneading nanoparticles such as $SiO_2$, $TiO_2$, and carbon nanotubes with the electrolyte above into a gel-like form may be used, or an electrolyte gelled using an organic gelling agent such as polyvinylidene fluoride, a polyethylene oxide derivative, and an amino acid derivative may also be used.

Meanwhile, the electrolyte 40 contains a redox couple consisting of $I^-/I_3^-$, and the concentration of $I_3^-$ is preferably 0.006 mol/L or less, more preferably from 0 to $6 \times 10^{-6}$ mol/L, and even more preferably from 0 to $6 \times 10^{-8}$ mol/L. In this case, it is possible to more reduce the leakage current since the concentration of $I_3^-$ which carries electrons is low. For this reason, it is possible to more increase the open circuit voltage, and thus it is possible to more improve the photoelectric conversion characteristics.

(First Connecting Portion)

The first connecting portion 61 contains at least first conductive particles, an inorganic filler, and a binder resin.

The first conductive particles may be any particles as long as they have conductivity, but they are usually metal particles. Examples of the metal constituting the metal particles may include silver, copper or an alloy of these metals with another metal. Examples of another metal may include gold and nickel.

The average particle diameter D1 of the first conductive particles is not particularly limited as long as it is greater than the average particle diameter D2 of the inorganic filler, but it is usually 15 µm or less. The average particle diameter D1 of the first conductive particles is preferably 10 µm or less. In this case, it is possible to further decrease the resistance between the first connecting portion 61 and the metal substrate 21 as compared to a case in which the average particle diameter D1 of the first conductive particles exceeds 10 µm. The average particle diameter D1 of the first conductive particles is more preferably 5 µm or less. However, the average particle diameter D1 of the first conductive particles is more preferably 0.02 µm or more. In this case, the voids in the first connecting portion 61 further decrease and the specific resistance of the first connecting portion 61 further decreases as compared to a case in which the average particle diameter D1 of the first conductive particles is less than 0.02 µm. The average particle diameter D1 of the first conductive particles is even more preferably 3.5 µm or more.

Examples of the inorganic filler may include a conductive material such as carbon and an ITO powder, and an inorganic insulating material such as glass frit. These can be used singly or in combination of two or more kinds thereof. Among them, a conductive material is preferable. In this case, since the inorganic filler is a conductive material, it is possible to further decrease the resistance between the first connecting portion 61 and the metal substrate 21 and to further improve the photoelectric conversion characteristics of the module 100. Here, the conductive material may be identical to or different from the conductive material constituting the first conductive particles, but it is preferably different for the reason to improve the conductivity and adhesive property between the metal substrate 21 and the first connecting portion 61.

The content rate of the first conductive particles in the first connecting portion 61 is not particularly limited, but it is preferably from 60 to 95 mass %. In this case, the ratio of the binder resin to the first conductive particles further increases and the adhesive property between the first connecting portion 61 and the metal substrate 21 is further improved as compared to a case in which the content rate of the first conductive particles in the first connecting portion 61 exceeds 95 mass %. In addition, the contact area between the first conductive particles further increases and the specific resistance of the first connecting portion 61 further decreases as compared to a case in which the content rate of the first conductive particles in the first connecting portion 61 is less than 60 mass %. The content rate of the first conductive particles in the first connecting portion 61 is more preferably from 70 to 90 mass %.

The inorganic filler may be in a particulate form or in a fibrous form, but it is preferably in a particulate form. In this case, the first connecting portion 61 does not exhibit angle dependency regardless of the direction in which the first connecting portion 61 comes into contact with the metal substrate 21 and the same adhesive force and resistance are obtained between the first connecting portion 61 and the metal substrate 21.

The average particle diameter D2 of the inorganic filler may be smaller than the average particle diameter D1 of the first conductive particles. In other words, D1–D2 may be greater than 0 µm. Here, D1–D2 is preferably 0.5 µm or more. In this case, the contact area between the first conductive particles further increases and the specific resistance of the first connecting portion 61 further decreases as compared to a case in which D1–D2 is less than 0.5 µm. However, D1–D2 is preferably 5 µm or less. In this case, the total volume of voids formed in the vicinity of the inorganic filler in the first connecting portion 61 further increases and the adhesive property between the first connecting portion 61 and the metal substrate 21 is further improved as compared to a case in which D1–D2 exceeds 5 µm.

The average particle diameter D2 of the inorganic filler is not particularly limited as long as it is smaller than the average particle diameter D1 of the first conductive particles, but it is preferably 2 µm or less. In this case, it is possible to further decrease the resistance between the first connecting portion 61 and the metal substrate 21 as compared to a case in which the average particle diameter D2 of the inorganic filler exceeds 2 µm. The average particle diameter D2 of the inorganic filler is more preferably 1 µm or less particularly in a case in which the inorganic filler is constituted by a conductive material and the metal substrate 21 is constituted by a metal capable of forming a passive state. In this case, it is possible to effectively decrease the resistance between the first connecting portion 61 and the metal substrate 21 as the inorganic filler breaks through the passive film formed on the surface of the metal substrate 21 and thus to further improve the photoelectric conversion characteristics of the module 100. Here, as the conductive material, carbon is preferable. In this case, it is possible to particularly effectively decrease the resistance between the first connecting portion 61 and the metal substrate 21. However, the average particle diameter D2 of the inorganic filler is more preferably 0.01 µm or more from the viewpoint of adhesive property between the metal substrate 21 and the first connecting portion 61. The average particle diameter D2 of the inorganic filler is more preferably 0.5 µm or more.

The content rate R1 of the inorganic filler in the first connecting portion 61 is not particularly limited as long as it is greater than the content rate R2 of the inorganic filler in the wiring material 60P, but it is usually 8 mass % or less. The content rate R1 of the inorganic filler in the first connecting portion 61 is preferably from 0.1 to 6 mass %. In this case, the contact area between the first conductive particles further increases and the specific resistance of the first connecting portion 61 further decreases as compared to a case in which the content rate R1 of the inorganic filler in the first connecting portion 61 exceeds 6 mass %. In addition, the total volume of voids formed in the vicinity of the inorganic filler in the first connecting portion 61 further increases and the adhesive property between the first connecting portion 61 and the metal substrate 21 is further improved as compared to a case in which the content rate R1 of the inorganic filler in the first connecting portion 61 is less than 0.1 mass %. The content rate R1 of the inorganic filler in the first connecting portion 61 is more preferably from 0.5 to 3 mass % and even more preferably from 1.2 to 3 mass %.

The binder resin is not particularly limited, and examples of such a binder resin may include a polyester resin, an epoxy resin, an acrylic resin, and a cellulose resin. These can be used singly or in combination of two or more kinds thereof.

The content rate of the binder resin in the first connecting portion 61 is not particularly limited, but it is preferably from 3 to 40 mass % and more preferably from 5 to 30 mass %.

(Wiring Material)

The wiring material 60P contains at least second conductive particles and a binder resin. The second conductive particles may be any particles as long as they have an element in common with the first conductive particles, but they are usually metal particles. As the metal constituting the metal particles, it is preferable to use one identical to the first conductive particles. In this case, the contact resistance between the first connecting portion 61 and the wiring material 60P further decreases since the first conductive particles and the second conductive particles are identical metal particles.

The content rate of the second conductive particles in the wiring material 60P is not particularly limited, but it is preferably from 50 to 95 mass %. In this case, the ratio of the binder resin to the second conductive particles further increases and the adhesive property between the first connecting portion 61 and the wiring material 60 is thus further improved as compared to a case in which the content rate of the second conductive particles in the wiring material 60P exceeds 95 mass %. In addition, in this case, the contact area between the second conductive particles further increases and the specific resistance of the wiring material 60P further decreases as compared to a case in which the content rate of the second conductive particles in the wiring material 60P is less than 50 mass %. The content rate of the second conductive particles in the wiring material 60P is more preferably from 60 to 90 mass %.

The average particle diameter of the second conductive particles is not particularly limited, but it is preferably 15 μm or less. In this case, the voids in the wiring material 60P further decrease and the specific resistance of the wiring material 60P further decreases as compared to a case in which the average particle diameter of the second conductive particles exceeds 15 μm. However, the average particle diameter of the second conductive particles is preferably 0.02 μm or more. In this case, the voids in the wiring material 60P further decrease and the specific resistance of the wiring material 60P further decreases as compared to a case in which the average particle diameter of the second conductive particles is less than 0.02 μm.

The binder resin is not particularly limited, and examples of such a binder resin may include a polyester resin, an epoxy resin, an acrylic resin, and a cellulose resin. These can be used singly or in combination of two or more kinds thereof. The binder resin in the wiring material 60P may be identical to or different from the binder resin in the first connecting portion 61.

However, it is preferable to use a polyester resin, an epoxy resin, or a mixture thereof as the binder resin in the wiring material 60P in a case in which a polyester resin, an epoxy resin, or a mixture thereof is used as the binder resin in the first connecting portion 61. In this case, it is possible to further enhance the adhesive property between the first connecting portion 61 and the metal substrate 21 and to more sufficiently suppress peeling off of the first connecting portion 61 from the metal substrate 21 as compared to a case in which the binder resin of the first connecting portion 61 does not contain the resin described above. In addition, it is also possible to enhance the adhesive property between the first connecting portion 61 and the wiring material 60P and to sufficiently suppress peeling off of the wiring material 60P from the first connecting portion 61 in a case in which the binder resin in the first connecting portion 61 and the binder resin in the wiring material 60P are identical to each other. Accordingly, the module 100 can have more excellent durability.

The content rate of the binder resin in the wiring material 60P is not particularly limited, but it is preferably from 3 to 40 mass % and more preferably from 5 to 30 mass %.

The wiring material 60P may contain an inorganic filler as long as the content rate R1 of the inorganic filler in the first connecting portion 61 is greater than the content rate R2 of the inorganic filler in the wiring material 60P, but it preferably does not contain an inorganic filler. In other words, the content rate R2 of the inorganic filler in the wiring material 60P is preferably 0% by mass. In this case, voids are less likely to be formed in the vicinity of the inorganic filler when the wiring material 60P expands and contracts and it is possible to more sufficiently suppress the occurrence of cracking in the wiring material 60P taking the voids as the starting point as compared to a case in which the content rate R2 of the inorganic filler in the wiring material 60P is greater than 0 mass %.

In a case in which the wiring material 60P contains an inorganic filler, the same one as the inorganic filler in the first connecting portion 61 can be used as the inorganic filler. In addition, in a case in which the wiring material 60P contains an inorganic filler, the content rate R2 of the inorganic filler in the wiring material 60P is preferably 3 mass % or less. In this case, it is possible to obtain more excellent durability as cracking is less likely to occur even if the wiring material 60P expands and contracts by the temperature change as compared to a case in which the content rate R2 of the inorganic filler in the wiring material 60P is out of the above range.

The content rate R2 of the inorganic filler in the wiring material 60P may be smaller than the content rate R1 of the inorganic filler in the first connecting portion 61. In other words, R1−R2 may be greater than 0 mass %. Here, R1−R2 is preferably 0.1 mass % or more. In this case, the total volume of voids formed in the vicinity of the inorganic filler in the first connecting portion 61 further increases and the adhesive property between the second conductive particles and the metal substrate 21 is further improved as compared to a case in which R1−R2 is less than 0.1 mass %. R1−R2 is even more preferably 0.5 mass % or more. R1−R2 is particularly preferably 1.2 mass % or more. However, R1−R2 is preferably 8 mass % or less and more preferably 6 mass % or less. In this case, the difference between R1−R2 is smaller, the expansion and contraction rates of the wiring material 60P and the first connecting portion 61 are closer to each other, and it is possible to effectively suppress the occurrence of peeling off at the interface between the wiring material 60P and the first connecting portion 61 as compared to a case in which R1−R2 exceeds 6 mass %.

(Back Sheet)

As described above, the back sheet 80 includes the laminate 80A including a weather resistant layer and a metal layer and the adhesive portion 80B which is provided on the surface of the cell 50 side of the laminate 80A and adheres the laminate 80A to the coupling portion 14.

The weather resistant layer may be constituted by, for example, polyethylene terephthalate or polybutylene terephthalate.

The thickness of the weather resistant layer may be from 50 to 300 μm, for example.

The metal layer may be constituted by, for example, a metallic material containing aluminum. The metallic material is usually constituted by aluminum simple substance but may be an alloy of aluminum with other metals. Examples of the other metals may include copper, manganese, zinc, magnesium, lead, and bismuth. Specifically, a 1000 series aluminum is desirable in which other metals are added to aluminum of 98% or higher purity in a trace quantity. This is because this 1000 series aluminum is inexpensive and excellent in workability compared to other aluminum alloys.

The thickness of the metal layer is not particularly limited but may be from 12 to 30 µm, for example.

The laminate 80A may further include a resin layer. Examples of the material constituting the resin layer may include a butyl rubber, a nitrile rubber, and a thermoplastic resin. These can be used singly or in combination of two or more kinds thereof. The resin layer may be formed on the entire surface on the side opposite to the weather resistant layer of the metal layer or may be formed only on the peripheral portion thereof.

Examples of the material constituting the adhesive portion 80B may include a butyl rubber, a nitrile rubber, and a thermoplastic resin. These can be used singly or in combination of two or more kinds thereof. The thickness of the adhesive portion 80B is not particularly limited but may be from 300 to 1000 µm, for example.

(Desiccant)

The desiccant 95 may be in a sheet shape or in a particulate form. The desiccant 95 may be one which absorbs moisture, for example, and examples of the desiccant 95 may include silica gel, alumina, and zeolite.

Figure 9:
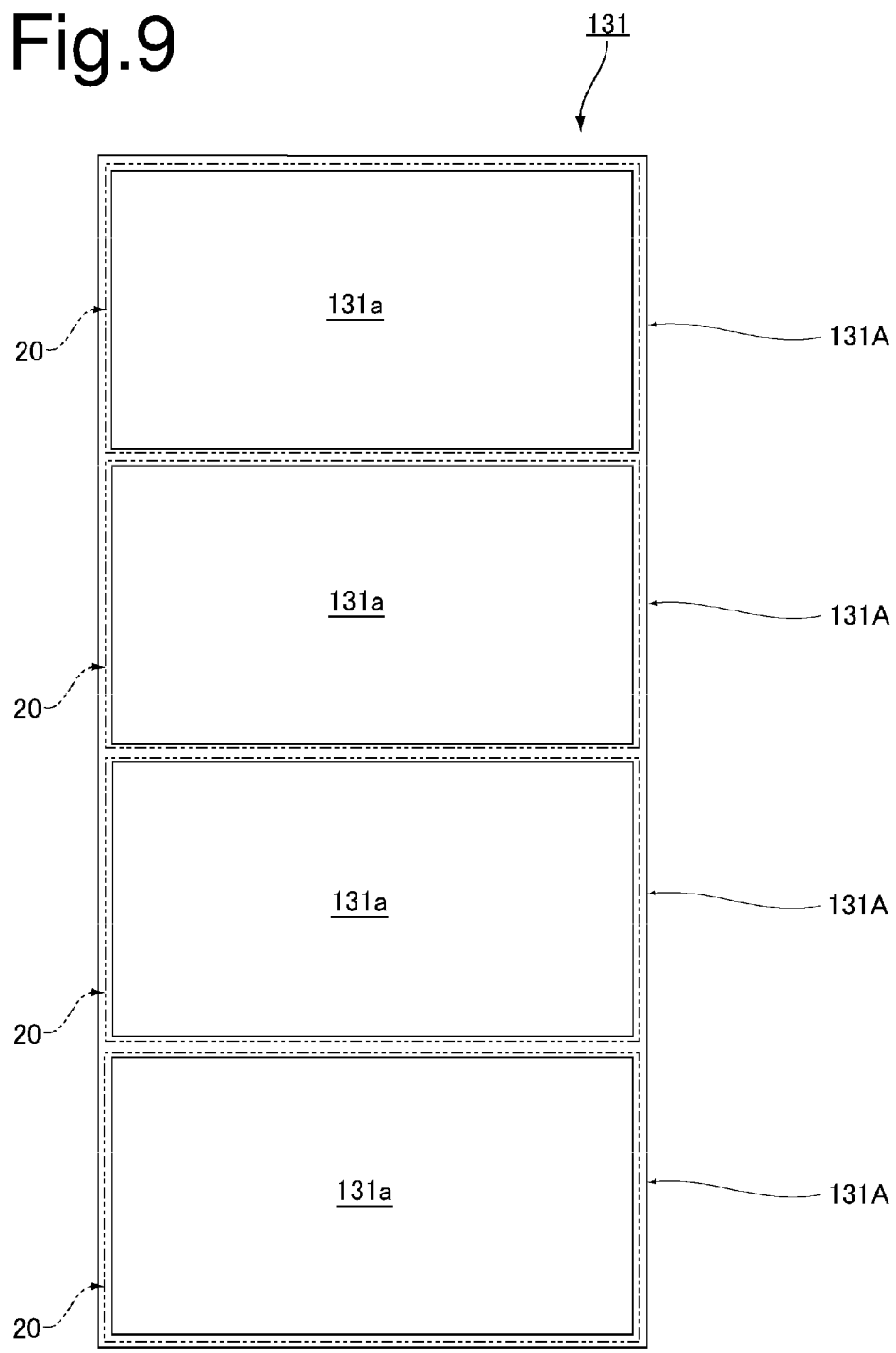
FIG. 9 is a plan view illustrating a first integrated sealing portion forming body for forming the first integrated sealing portion of FIG. 4.

Next, the method of manufacturing the module 100 will be described with reference to FIG. 3, FIG. 7 and FIG. 9. FIG. 9 is a plan view illustrating a first integrated sealing portion forming body for forming a first integrated sealing portion of FIG. 4.

First, a laminate obtained by forming a transparent conductive layer on one transparent substrate 11 is prepared.

As the method of forming the transparent conductive layer, a sputtering method, a vapor deposition method, a spray pyrolysis deposition method, or a CVD method is used.

Next, as illustrated in FIG. 3, the groove 90 is formed with respect to the transparent conductive layer, and the transparent conductive layers 12A to 12F which are disposed in an insulated state to interpose the groove 90 between one another are formed. Specifically, the four transparent conductive layers 12A to 12D corresponding to the cells 50A to 50D are formed so as to have the quadrangular-shaped main body portion 12a and the protruding portion 12c. At this time, the transparent conductive layers 12A to 12C corresponding to the cells 50A to 50C are formed such that the protruding portion 12c has not only the projecting portion 12d but also the facing portion 12e which extends from the projecting portion 12d and faces the main body portion 12a of the adjacent cell 50. In addition, the transparent conductive layer 12D is formed so as to have not only the quadrangular-shaped main body portion 12a and the projecting portion 12d but also the first current extracting portion 12f and the connecting portion 12g connecting the first current extracting portion 12f and the main body portion 12a. At this time, the first current extracting portion 12f is formed so as to be disposed on the side opposite to the transparent conductive layer 12B with respect to the transparent conductive layer 12A. Moreover, the transparent conductive layer 12E is formed so as to form the second current extracting portion 12h. At this time, the second current extracting portion 12h is formed so as to be disposed on the side opposite to the transparent conductive layer 12B with respect to the transparent conductive layer 12A and to be disposed next to the first current extracting portion 12f via the groove 90.

It is possible to form the groove 90 by, for example, a laser scribing method using a YAG laser, a $CO_2$ laser or the like as the light source.

In this manner, a transparent conductive layer 12 is formed on the transparent substrate 11.

Next, a precursor of the connecting terminal 16 constituted by the wiring material connecting portion 16A and the wiring material non-connecting portion 16B is formed on the protruding portion 12c of the transparent conductive layers 12A to 12C. Specifically, the precursor of the connecting terminal 16 is formed such that the wiring material connecting portion 16A is provided on the facing portion 12e. In addition, the precursor of the connecting terminal 16 is also formed on the transparent conductive layer 12E. In addition, the precursor of the wiring material non-connecting portion 16B is formed so as to be narrower than the width of the wiring material connecting portion 16A. The precursor of the connecting terminal 16 can be formed, for example, by coating and drying a silver paste.

Moreover, a precursor of the current collecting wiring 17 is formed on the connecting portion 12g of the transparent conductive layer 12D. The precursor of the current collecting wiring 17 can be formed, for example, by coating and drying a silver paste.

In addition, precursors of the external connecting terminals 18a and 18b for extracting the current to the outside are respectively formed on the first current extracting portion 12f and the second current extracting portion 12h of the transparent conductive layer 12A. The precursor of the external connecting terminal can be formed, for example, by coating and drying a silver paste.

Furthermore, a precursor of the insulating material 33 composed of a glass frit is formed so as to enter into the first groove 90A formed along the edge portion of the main body portion 12a and to cover the edge portion of the main body portion 12a as well. The insulating material 33 can be formed, for example, by coating and drying a paste containing a glass frit.

In addition, in order to fix the back sheet 80, in the same manner as the insulating material 33, a precursor of the annular coupling portion 14 is formed so as to surround the insulating material 33 and to pass through the transparent conductive layer 12D, the transparent conductive layer 12E, and the transparent conductive layer 12F.

Furthermore, on each of the main body portions 12a of the transparent conductive layers 12A to 12D, a precursor of the oxide semiconductor layer 13 is formed.

The precursor of the oxide semiconductor layer 13 is obtained by printing a paste for oxide semiconductor layer for forming the oxide semiconductor layer 13 and then drying. The paste for oxide semiconductor layer contains a titanium oxide, a resin such as polyethylene glycol, ethyl cellulose, or the like, and a solvent such as terpineol or the like.

As a method of printing the paste for oxide semiconductor layer and the paste for reflecting layer, for example, a screen printing method, a doctor blade method, a barcode method, or the like may be used.

Finally, the precursor of the connecting terminal 16, the precursor of the insulating material 33, the precursor of the coupling portion 14, and the precursor of the oxide semiconductor layer 13 are collectively fired to form the connecting terminal 16, the insulating material 33, the coupling portion 14, and the oxide semiconductor layer 13.

At this time, the firing temperature varies depending on the kind of the oxide semiconductor particles or the glass frit but is usually from 350 to 600° C., and the firing time also varies depending on the kind of the oxide semiconductor particles or the glass frit but is usually from 1 to 5 hours.

In this manner, as illustrated in FIG. 7, obtained is the working electrode 10 which has the conductive substrate 15 and on which the coupling portion 14 for fixing the back sheet 80 is formed.

Next, the photosensitizing dye is supported on the oxide semiconductor layer 13 of the working electrode 10. For this, the photosensitizing dye may be adsorbed on the oxide semiconductor layer 13 by immersing the working electrode 10 in a solution containing the photosensitizing dye, the extra photosensitizing dye is then washed out with the solvent component of the above solution, and drying is performed, thereby the photosensitizing dye may be adsorbed on the oxide semiconductor layer 13. However, it is also possible to support the photosensitizing dye on the oxide semiconductor layer 13 by coating a solution containing the photosensitizing dye on the oxide semiconductor layer 13 and then drying to adsorb the photosensitizing dye on the oxide semiconductor layer 13.

Next, the electrolyte 40 is disposed on the oxide semiconductor layer 13.

Next, as illustrated in FIG. 9, a first integrated sealing portion forming body 131 for forming the first integrated sealing portion 31 is prepared. The first integrated sealing portion forming body 131 can be obtained by preparing one sheet of resin film for sealing composed of the material constituting the first integrated sealing portion 31 and forming a quadrangular-shaped opening 131a in the resin film for sealing as many as the number of the cells 50. The first integrated sealing portion forming body 131 has a structure obtained by integrating a plurality of first sealing portion forming bodies 131A.

Thereafter, this first integrated sealing portion forming body 131 is adhered on the conductive substrate 15. At this time, the first integrated sealing portion forming body 131 is adhered so as to be superimposed on the insulating material 33. The adhesion of the first integrated sealing portion forming body 131 to the conductive substrate 15 can be performed by heating and melting the first integrated sealing portion forming body 131. In addition, the first integrated sealing portion forming body 131 is adhered to the conductive substrate 15 such that the main body portion 12a of the transparent conductive layer 12 is disposed on the inner side of the first integrated sealing portion forming body 131.

On the other hand, the counter electrodes 20 are prepared to have the same number as the number of the cells 50.

The counter electrode 20 can be obtained by forming the conductive catalyst layer 22 which promotes the reduction reaction on the surface of the counter electrode 20 on the metal substrate 21.

Next, one more piece of the first integrated sealing portion forming body 131 described above is prepared. Thereafter, each of the plural counter electrodes 20 is bonded so as to close each of the openings 131a of the first integrated sealing portion forming body 131.

Next, the first integrated sealing portion forming body 131 adhered to the counter electrode 20 and the first integrated sealing portion forming body 131 adhered to the working electrode 10 are superimposed and melted by heating while applying a pressure to the first integrated sealing portion forming body 131. In this manner, the first integrated sealing portion 31 is formed between the working electrode 10 and the counter electrode 20. At this time, the first integrated sealing portion 31 is formed such that the width P of the adhesive portion of the surface on the conductive substrate 15 side of the counter electrode 20 with the partitioning portion 31b of the first integrated sealing portion 31 is narrower than the width Q of the adhesive portion of the surface on the conductive substrate 15 side of the counter electrode 20 with the annular portion 31a of the first integrated sealing portion 31. In addition, the first integrated sealing portion 31 is formed such that the width R of the partitioning portion 31b of the first integrated sealing portion 31 is 100% or more and less than 200% of the width T of the annular portion 31a of the first integrated sealing portion 31. The formation of the first integrated sealing portion 31 may be performed under the atmospheric pressure or reduced pressure, but it is preferable to be performed under reduced pressure.

Next, the second integrated sealing portion 32 is prepared (see FIG. 5). The second integrated sealing portion 32 has a structure obtained by integrating a plurality of the first sealing portions 32A. The second integrated sealing portion 32 can be obtained by preparing one sheet of resin film for sealing and forming a quadrangular-shaped opening 32c in the resin film for sealing as many as the number of the cells 50. The second integrated sealing portion 32 is bonded to the counter electrode 20 so as to sandwich the edge portion 20a of the counter electrode 20 together with the first integrated sealing portion 31. The adhesion of the second integrated sealing portion 32 to the counter electrode 20 can be performed by heating and melting the second integrated sealing portion 32.

Examples of the resin film for sealing may include a resin such as a modified polyolefin resin including an ionomer, an ethylene-vinyl acetic anhydride copolymer, an ethylene-methacrylic acid copolymer, an ethylene-vinyl alcohol copolymer and the like, an ultraviolet-cured resin, and vinyl alcohol polymer.

Next, the bypass diodes 70A, 70B, and 70C are fixed to the partitioning portions 32b of the second sealing portions 32. In addition, the bypass diode 70D is fixed on the sealing portion 30A of the cell 50D as well.

Thereafter, the conductive first connecting portion 61 is formed on each of the metal substrates 21 of the cells 50A to 50D. The first connecting portion 61 can be obtained by preparing a paste containing the material constituting the first connecting portion 61, coating this paste on the metal substrate 21 of the counter electrode 20, and curing the paste.

Next, a wiring material 60P1 is formed so as to connect the first connecting portion 61 on the metal substrate 21 of the cell 50A with the wiring material connecting portion 16A of the connecting terminal 16 on the transparent conductive layer 12E. Specifically, the wiring material 60P1 is obtained by preparing a paste containing the material constituting the wiring material 60P1, coating this paste so as to join the first connecting portion 61 with the wiring material connecting portion 16A of the connecting terminal 16 on the transparent conductive layer 12E and to come into contact with the sealing portion 30A, and curing the paste.

In the same manner, the wiring material 60P2 is formed so as to connect the first connecting portion 61 on the metal substrate 21 of the cell 50B with the wiring material connecting portion 16A of the connecting terminal 16 on the transparent conductive layer 12A, the wiring material 60P3 is formed so as to connect the first connecting portion 61 on the metal substrate 21 of the cell 50C with the wiring material connecting portion 16A of the connecting terminal 16 on the transparent conductive layer 12B, and the wiring material 60P4 is formed so as to connect the first connecting portion 61 on the metal substrate 21 of the cell 50D with the wiring material connecting portion 16A of the connecting terminal 16 on the transparent conductive layer 12C. Furthermore, the wiring material 60R is formed so as to connect the bypass diode 70D with the transparent conductive layer 12D.

Thereafter, the wiring material 60Q is formed on the metal substrate 21 of the counter electrode 20 so as to connect the bypass diodes 70A to 70D with the first connecting portion 61.

Finally, the back sheet 80 is prepared, and the peripheral portion 80*a* of the back sheet 80 is adhered to the coupling portion 14. At this time, the back sheet 80 is disposed such that the adhesive portion 80B of the back sheet 80 is spaced apart from the sealing portion 30A of the cell 50.

The module 100 is obtained in the manner described above.

Meanwhile, in the description above, a method to collectively fire the precursor of the connecting terminal 16, the precursor of the insulating material 33, the precursor of the coupling portion 14, and the precursor of the oxide semiconductor layer 13 is used in order to form the connecting terminal 16, the insulating material 33, the coupling portion 14, and the oxide semiconductor layer 13, but the connecting terminal 16, the insulating material 33, the coupling portion 14, and the oxide semiconductor layer 13 may be formed by separately firing each of the precursors.

Figure 10:
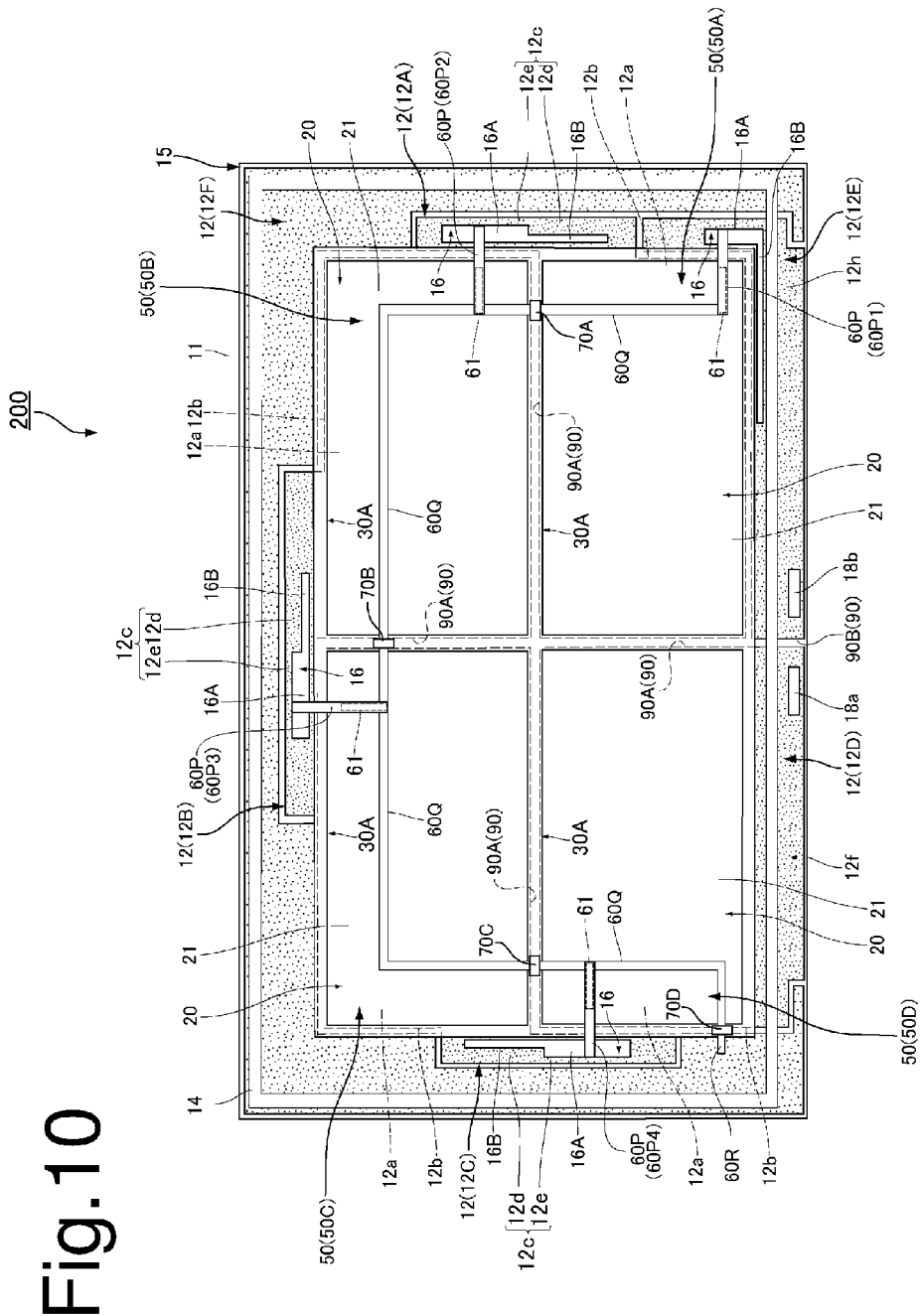
FIG. 10 is a plan view illustrating a portion of a second embodiment of the dye-sensitized photoelectric conversion element of the invention.

The invention is not limited to the embodiment described above. For example, in the above embodiment, the cells 50A to 50D are arranged in a line along the X direction in FIG. 2, but the cells 50C and 50D which are a part of the cells 50A to 50D are folded back in the middle and the cell 50A and the cell 50D are disposed so as to be adjacent to each other as a module 200 illustrated in FIG. 10. In this case, unlike the module 100, it is not necessary to provide the connecting portion 12*g* between the main body portion 12*a* and the first current extracting portion 12*f* in the transparent conductive layer 12D. For this reason, it is also not necessary to provide the current collecting wiring 17.

Figure 11:
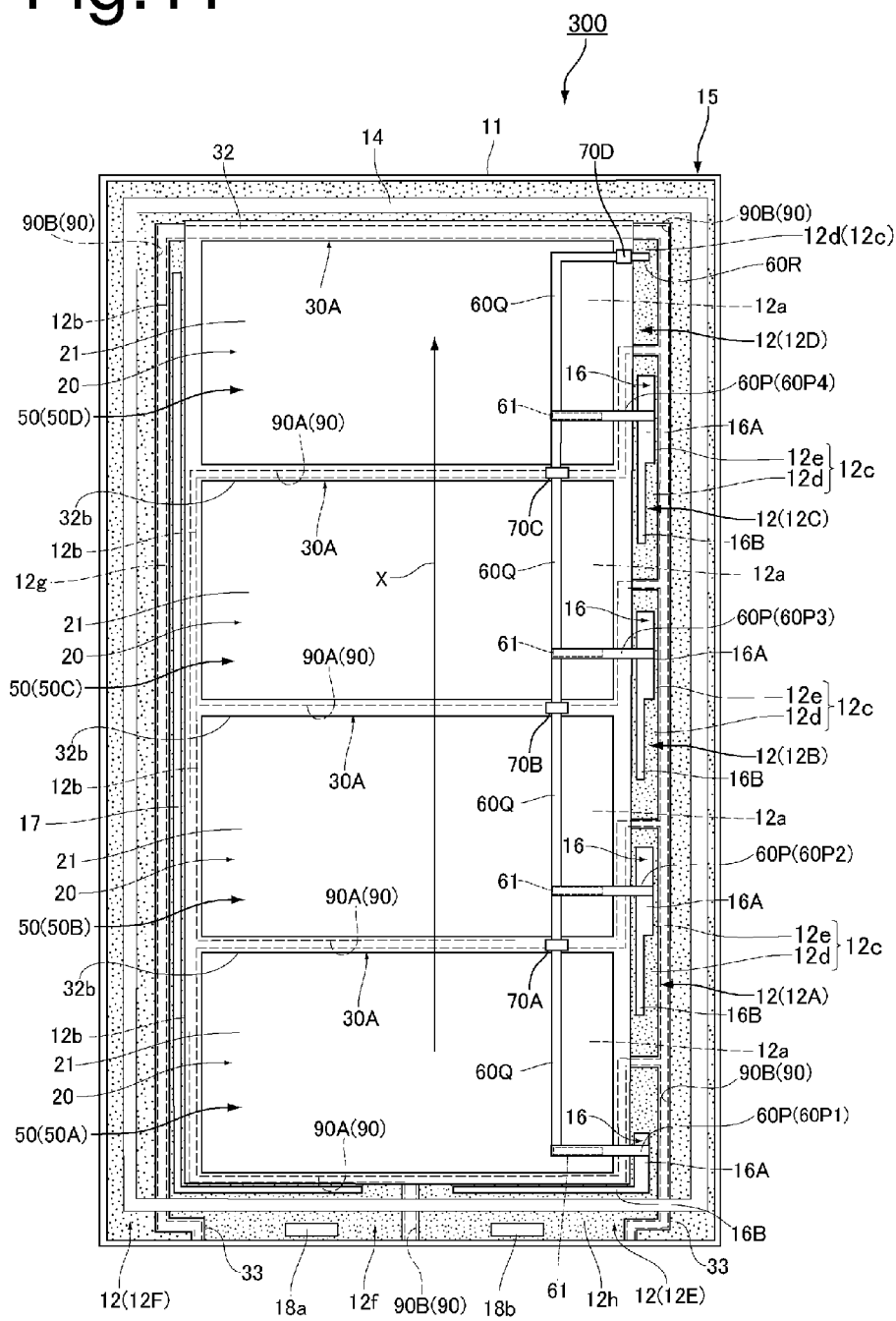
FIG. 11 is a plan view illustrating a portion of a third embodiment of the dye-sensitized photoelectric conversion element of the invention.

In addition, in the above embodiment, the second groove 90B which intersects the coupling portion 14 between the back sheet 80 and the conductive substrate 15 is not covered with the insulating material 33 made of a glass frit. However, like the module 300 illustrated in FIG. 11, the second groove 90B is preferably covered with the insulating material 33 made of a glass frit. In addition, in FIG. 11, the back sheet 80 is omitted. As illustrated in FIG. 11, if the second groove 90B intersects the coupling portion 14, moisture can be infiltrated through the second groove 90B into the space between the back sheet 80 and the conductive substrate 15. In this case, the insulating material 33 enters into the second groove 90B, and the insulating material 33 covers an edge portion of the portion of the transparent conductive layer 12 excluding the main body portion 12*a*, so that the infiltration of the moisture from the outer side of the back sheet 80 into the inner side is sufficiently suppressed. For this reason, the entrance of the moisture being infiltrated into the space between the back sheet 80 and the conductive substrate 15 into the inner side of the sealing portion 30A through the sealing portion 30A is sufficiently suppressed. For this reason, a deterioration in durability of the module 300 can be sufficiently suppressed.

Figure 12:
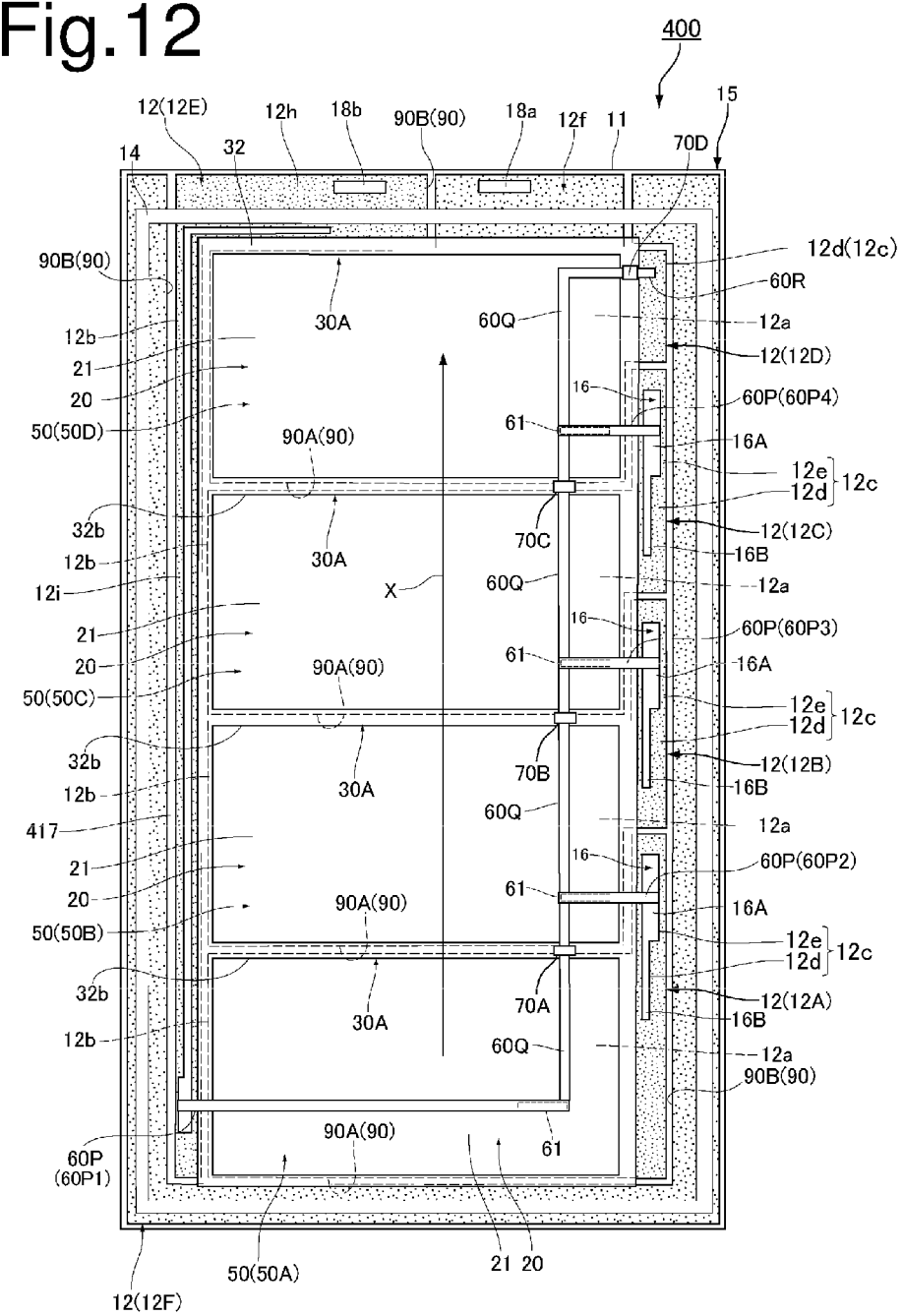
FIG. 12 is a plan view illustrating a portion of a fourth embodiment of the dye-sensitized photoelectric conversion element of the invention.

Furthermore, in the above embodiment, the first current extracting portion 12*f* and the second current extracting portion 12*h* are disposed in the vicinity on the cell 50A side, but the first current extracting portion 12*f* and the second current extracting portion 12*h* may be disposed in the vicinity on the cell 50D side as illustrated in a module 400 illustrated in FIG. 12. In this case, the first current extracting portion 12*f* is provided so as to protrude on the side opposite to the cell 50C with respect to the main body portion 12*a* of the transparent conductive layer 12D to the outer side of the sealing portion 30A. On the other hand, the second current extracting portion 12*h* is provided on the side opposite to the cell 50C with respect to the main body portion 12*a* of the transparent conductive layer 12D. In addition, a connecting portion 12*i* as a portion to be connected extends along the transparent conductive layers 12A to 12D, and this connecting portion 12*i* connects the second current extracting portion 12*h* and the metal substrate 21 of the counter electrode 20 of the cell 50A. Specifically, a current collecting wiring 417 is provided on the connecting portion 12*i* along the connecting portion 12*i*, and this current collecting wiring 417 is connected with the wiring material 60P extending from the wiring material 60Q connected with the bypass diode 70A. It is possible to achieve space saving while having excellent photoelectric conversion characteristics by this module 400 as well. Meanwhile, in this case, it is the same as the above embodiment that it is preferable that the resistance value of the connecting portion 12*i* be equal to or less than the resistance value represented by the following Equation (1).

$$\text{Resistance value} = \text{number of cells 50 connected in series} \times 120 \, \Omega \quad (1)$$

In addition, in the above embodiment, the conductive substrate 15 has the insulating material 33. However, the conductive substrate may not have the insulating material 33. In this case, the sealing portion 30A and the first integrated sealing portion 31A are bonded to the transparent substrate 11, the transparent conductive layer 12, or the connecting terminal 16. Herein, the conductive substrate 15 may not have the connecting terminal 16. In this case, the sealing portion 30A and the first integrated sealing portion 31A are bonded to the transparent substrate 11 or the transparent conductive layer 12.

In addition, in the above embodiment, the groove 90 has the second groove 90B. However, the second groove 90B may not be necessarily formed.

In addition, in the above embodiment, the widths of the wiring material connecting portion 16A and the wiring material non-connecting portion 16B of the connecting terminal 16 are set to be constant, but each of the widths of the wiring material connecting portion 16A and the wiring material non-connecting portion 16B may change along the extending direction of the connecting terminal 16. For example, the width may monotonically increase from the end portion on the farthest side from the wiring material connecting portion 16A of the wiring material non-connecting portion 16B toward the end portion on the closest side thereof, and the width may monotonically increase from the end portion of the wiring material non-connecting portion 16B side of the wiring material connecting portion 16A toward the end portion on the farthest side from the wiring material non-connecting portion 16B.

In addition, in the above embodiment, the wiring material connecting portion 16A and the wiring material non-connecting portion 16B are provided along the sealing portion 30A, respectively, but these may be formed so as to extend in the direction away from the sealing portion 30A. However, in this case, it is preferable that the wiring material connecting portion 16A be disposed at the position closer to the sealing portion 30A than the wiring material non-connecting portion 16B. In this case, it is possible to more shorten the wiring material 60P.

Alternatively, in the connecting terminal 16 formed on the transparent conductive layers 12A to 12C, the wiring material non-connecting portion 16B may be disposed so that it is orthogonal to the wiring material connecting portion 16A.

In addition, the width of the wiring material connecting portion 16A is equal to or less than the width of the wiring material non-connecting portion 16B.

In addition, in the above embodiment, the second sealing portion 32A is adhered to the first sealing portion 31A, but the second sealing portion 32A may not be adhered to the first sealing portion 31A.

Furthermore, in the above embodiment, the sealing portion 30A is constituted by the first sealing portion 31A and the second sealing portion 32A, but the second sealing portion 32A may be omitted.

In addition, in the above embodiment, the width P of the adhesive portion of the counter electrode 20 with the partitioning portion 31b of the first integrated sealing portion 31 is narrower than the width Q of the adhesive portion of the counter electrode 20 with the annular portion 31a of the first integrated sealing portion 31, but the width P of the adhesive portion may be equal to or more than the width Q of the adhesive portion.

Furthermore, in the above embodiment, the width R of the partitioning portion 31b of the first integrated sealing portion 31 is 100% or more and less than 200% of the width T of the annular portion 31a of the first integrated sealing portion 31, but the width R of the partitioning portion 31b may be less than 100% or 200% or more of the width T of the annular portion 31a of the first integrated sealing portion 31.

In addition, in the above embodiment, the back sheet 80 is adhered to the transparent conductive layer 12 via the coupling portion 14 made of a glass frit, but the back sheet 80 is not required to be necessarily adhered to the transparent conductive layer 12 via the coupling portion 14.

Furthermore, in the above embodiment, the coupling portion 14 is spaced apart from the insulating material 33, but it is preferable that both of these be constituted by a glass frit and integrated. In this case, the interface between the coupling portion 14 and the conductive substrate 15 and the interface between the sealing portion 30A and the conductive substrate 15 are not present even if moisture penetrates into the space between the back sheet 80 and the conductive substrate 15. In addition, both of the insulating material 33 and the coupling portion 14 are composed of a glass frit and thus have a higher sealing ability compared to a resin. For this reason, it is possible to sufficiently suppress the penetration of moisture through the interface between the coupling portion 14 and the conductive substrate 15 and the interface between the insulating material 33 and the conductive substrate 15.

In addition, in the above embodiment, the insulating material 33 is composed of a glass frit, but the material constituting the insulating material 33 may be one having a higher melting point than the material constituting the first sealing portion 30A. For this reason, examples of such a material may include a thermosetting resin such as a polyimide resin and a thermoplastic resin in addition to a glass frit. Among them, it is preferable to use a thermosetting resin. In this case, even if the sealing portion 30A has fluidity at a high temperature, the insulating material 33 is less likely to be fluidized even at a high temperature compared to the case of being composed of a thermoplastic resin in the same manner as the case of being composed of a glass frit. For this reason, the contact of the conductive substrate 15 with the counter electrode 20 can be sufficiently suppressed, and thus the short circuit between the conductive substrate 15 and the counter electrode 20 can be sufficiently suppressed.

In addition, in the embodiment described above, the portion to be connected is constituted by the wiring material connecting portion 16A, but the portion to be connected may be the part at which the other end of the wiring material 60P comes into contact, and the portion to be connected may be constituted by the transparent conductive layer 12, for example, in a case in which the other end of the wiring material 60P comes into direct contact with the transparent conductive layer 12.

Furthermore, in the embodiment described above, a plurality of cells 50 are connected in series by the wiring material 60P, but they may be connected in parallel. In this case, one end of the wiring material 60P is connected to the metal substrate 21 of one cell 50 of two adjacent cells 50 via the first connecting portion 61 and the other end of the wiring material 60P is connected to the metal substrate 21 of the other cell 50 via the first connecting portion 61. In other words, the first connecting portion 61 also serves as the portion to be connected.

Furthermore, in the embodiment described above, the first connecting portion 61 is not in contact with the sealing portion 30A, but the first connecting portion 61 may be in contact with the sealing portion 30A.

Figure 13:
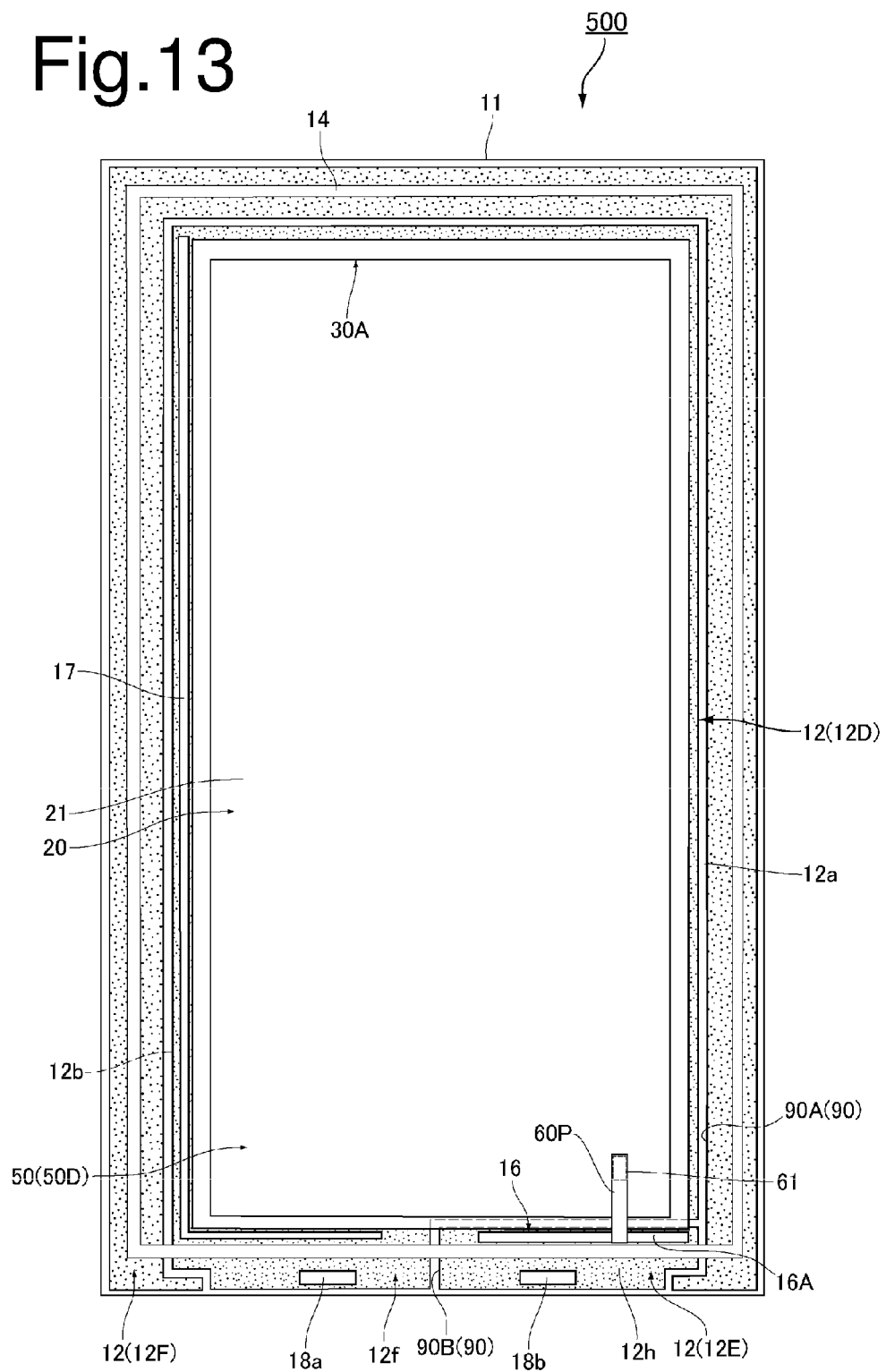
FIG. 13 is a plan view illustrating a portion of a fifth embodiment of the dye-sensitized photoelectric conversion element of the invention.

Furthermore, in the embodiment described above, a plurality of cells 50 are used, but in the invention, only one cell may be used as in the module 500 illustrated in FIG. 13. In the module 500 illustrated in FIG. 13, the cells 50B to 50D in the module 100 are omitted and the connecting terminal 16 provided on the second current extracting portion 12h and the metal substrate 21 of the counter electrode 20 of the cell 50A are electrically connected to each other via the wiring material 60P. Here, the fact that the wiring material 60P and the metal substrate 21 are connected to each other by the first connecting portion 61 is the same as in the embodiment described above. In addition, in the module 500, the connecting terminal 16 is constituted only by the wiring material connecting portion 16A, and this wiring material connecting portion 16A is disposed between the sealing portion 30A and the external connecting terminal 18b. In other words, the wiring material connecting portion 16A is not disposed at the position facing the side edge portion 12b of the main body portion 12a in the transparent conductive layer 12A of the cell 50A. For this reason, in the module 100 of the first embodiment, it is possible to extend the oxide semiconductor layer 13 to the space of the part at which the wiring material connecting portion 16A is disposed. In this case, it is possible to extend the power generation area as well as useless space is effectively utilized.

Furthermore, in the embodiment described above, the groove 90 is formed on the transparent conductive layer 12 and the insulating material 33 enters the first groove 90A. However, the insulating material 33 is not necessarily required to enter the first groove 90A, and the groove 90 is not also required to be formed on the transparent conductive layer 12. It is not required to form the groove 90 on the transparent conductive layer 12, for example, in a case in which the module has only one dye-sensitized photoelectric conversion cell. In this case, the insulating material 33 does not enter the first groove 90A.

EXAMPLES

Hereinafter, the content of the invention will be described more specifically with reference to Examples, but the invention is not limited to the following Examples.

Example 1

First, a laminate obtained by forming a transparent conductive layer composed of FTO having a thickness of 1 µm on a transparent substrate which is composed of glass and has a thickness of 1 mm was prepared. Next, as illustrated in FIG. 3, the groove 90 was formed on the transparent conductive layer 12 by a $CO_2$ laser (V-460 manufactured by Universal Laser Systems Inc.), and the transparent conductive layers 12A to 12F were formed. At this time, the width of the groove 90 was set to 1 mm. In addition, each of the transparent conductive layers 12A to 12C was formed so as to have the main body portion having a quadrangular shape of 4.6 cm×2.0 cm and the protruding portion protruding from the side edge portion of one side of the main body portion. In addition, the transparent conductive layer 12D was formed so as to have the main body portion having a quadrangular shape of 4.6 cm×2.1 cm and the protruding portion protruding from the side edge portion of one side of the main body portion. In addition, the protruding portion 12c of the three transparent conductive layers 12A to 12C among the transparent conductive layers 12A to 12D was constituted by the projecting portion 12d projecting from the one side edge portion 12b of the main body portion 12a and the facing portion 12e which is extended from the projecting portion 12d and faced the main body portion 12a of the adjacent transparent conductive layer 12. In addition, the protruding portion 12c of the transparent conductive layer 12D was constituted only by the projecting portion 12d projecting from the one side edge portion 12b of the main body portion 12a. At this time, the length of the projecting direction (the direction orthogonal to the X direction in FIG. 2) of the projecting portion 12d was set to 2.1 mm and the width of the projecting portion 12d was set to 9.8 mm. In addition, the width of the facing portion 12e was set to 2.1 mm and the length of the facing portion 12e in the extending direction was set to 9.8 mm.

In addition, the transparent conductive layer 12D was formed so as to have not only the main body portion 12a and the protruding portion 12c but also the first current extracting portion 12f and the connecting portion 12g connecting the first current extracting portion 12f and the main body portion 12a. The transparent conductive layer 12E was formed so as to have the second current extracting portion 12h. At this time, the width of the connecting portion 12g was set to 1.3 mm and the length thereof was set to 59 mm. In addition, when the resistance value of the connecting portion 12g was measured by the four probe method, it was 100Ω.

Next, a precursor of the connecting terminal 16 constituted by the wiring material connecting portion 16A and the wiring material non-connecting portion 16B was formed on the protruding portion 12c of the transparent conductive layers 12A to 12C. Specifically, the precursor of the connecting terminal 16 was formed such that a precursor of the wiring material connecting portion 16A was provided on the facing portion 12e and a precursor of the wiring material non-connecting portion 16B was provided on the projecting portion 12d. At this time, the precursor of the wiring material non-connecting portion 16B was formed so as to be narrower than the width of the wiring material connecting portion 16A. The precursor of the connecting terminal 16 was formed by applying the silver paste ("GL-6000X16" manufactured by FUKUDA METAL FOIL & POWDER Co., LTD.) by screen printing and drying it.

Furthermore, a precursor of the current collecting wiring 17 was formed on the connecting portion 12g of the transparent conductive layer 12D. The precursor of the current collecting wiring 17 was formed by applying the silver paste by screen printing and drying it.

In addition, precursors of the external connecting terminals 18a and 18b for extracting the current to the outside were formed on the first current extracting portion 12f and the second current extracting portion 12h of the transparent conductive layer 12A, respectively. The precursors of the external connecting terminals were formed by applying the silver paste by screen printing and drying it.

Moreover, a precursor of the insulating material 33 composed of a glass frit was formed so as to enter into the first groove 90A and to cover the edge portion of the main body portion 12a forming the first groove 90A. The insulating material 33 was formed by applying a paste containing a glass frit by screen printing and drying it. At this time, the edge portion of the transparent conductive layer covered with the insulating material 33 was the part between the groove 90 and the position 0.2 mm away from the groove 90.

In addition, in order to fix the back sheet 80, in the same manner as the insulating material 33, a precursor of the annular coupling portion 14 composed of a glass frit was formed so as to surround the insulating material 33 and to pass through the transparent conductive layer 12D, the transparent conductive layer 12E, and the transparent conductive layer 12F. In addition, at this time, the precursor of the coupling portion 14 was formed such that the precursor of the current collecting wiring 17 was disposed on the inner side thereof. In addition, the coupling portion 14 was formed such that the first current extracting portion and the second current extracting portion were disposed on the outer side thereof. The coupling portion 14 was formed by applying a paste containing a glass frit by screen printing and drying it.

Furthermore, a precursor of the oxide semiconductor layer 13 was formed on the main body portion 12a of each of the transparent conductive layers 12A to 12D. At this time, the precursor of the oxide semiconductor layer was obtained by applying a nanoparticle paste of a titanium oxide for forming the light absorbing layer containing an anatase crystalline titanium oxide (PST-21NR produced by JGC Catalysts and Chemicals Ltd.) in a square shape by screen printing and drying it at 150° C. for 10 minutes.

Next, the precursor of the connecting terminal 16, the precursor of the current collecting wiring 17, the precursors of the external connecting terminals 18a and 18b, the precursor of the insulating material 33, the precursor of the coupling portion 14, the precursor of the insulating material 33, and the precursor of the oxide semiconductor layer 13 were fired at 500° C. for 15 minutes to form the connecting terminal 16, the current collecting wiring 17, the external connecting terminals 18a and 18b, the coupling portion 14, the insulating material 33, and the oxide semiconductor layer 13. In this manner, the working electrode 10 which has the conductive substrate 15 and on which the coupling portion 14 is formed was obtained. At this time, the width of the wiring material connecting portion of the connecting terminal 16 was 1.0 mm and the width of the wiring material non-connecting portion thereof was 0.3 mm. In addition, the length along the extending direction of the wiring material connecting portion was 7.0 mm and the length along the extending direction of the wiring material non-connecting portion was 7.0 mm. In addition, the dimensions of the current collecting wiring 17, the external connecting terminals 18a and 18b, the coupling portion 14, and the oxide semiconductor layer 13 were as follows, respectively.
Current collecting wiring 17: 4 µm in thickness, 200 µm in width, 79 mm in length along the X direction in FIG. 2, and 21 mm in length along the direction orthogonal to the X direction in FIG. 2,
External connecting terminals 18a and 18b: 20 µm in thickness, 2 µm in width, and 7 mm in length,
Coupling portion 14: 50 µm in thickness, 3 mm in width, and
Oxide semiconductor layer 13: 14 µm in thickness, 17 mm in length in the X direction in FIG. 2, and 42.1 mm in length in the direction orthogonal to the X direction in FIG. 2

In this manner, the working electrode was obtained.

Next, the working electrode obtained in the above-described manner was immersed for a whole day and night in a dye solution containing 0.2 mM of a photosensitizing dye consisting of N719 and using a mixed solvent obtained by mixing acetonitrile and tert-butanol at a volume ratio of 1:1 as the solvent, and then taken out therefrom and dried, and thus the photosensitizing dye was supported on the oxide semiconductor layer.

Next, an electrolyte obtained by adding $I_2$, 1-methyl benzimidazole, 1-butyl benzimidazole, guanidium thiocyanate, and t-butylpyridine to a mixture of 1,2-dimethyl-3-propyl imidazolium iodide and 3-methoxy propionitrile was applied on the oxide semiconductor layer by a screen printing method and drying was performed, so that the electrolyte was arranged.

Next, the first integrated sealing portion forming body for forming the first sealing portion was prepared. The first integrated sealing portion forming body was obtained by preparing one sheet of resin film for sealing which had 8.0 cm×4.6 cm×50 µm and was composed of a maleic anhydride-modified polyethylene (product name: Bynel produced by DuPont) and forming four quadrangular-shaped openings in the resin film for sealing. At this time, the first integrated sealing portion forming body was fabricated such that each opening had a size of 1.7 cm×4.2 cm×50 µm, the width of the annular portion was 2 mm, and the width of the partitioning portion partitioning the inner side opening of the annular portion was 2.6 mm.

Thereafter, the first integrated sealing portion forming body was superimposed on the insulating material 33 of the working electrode and then the first integrated sealing portion forming body was adhered to the insulating material 33 on the working electrode by heating and melting.

Next, four sheets of the counter electrodes were prepared. Two counter electrodes of the four sheets of the counter electrodes were prepared by forming the catalyst layer which had a thickness of 5 nm and was composed of platinum on the titanium foil of 4.6 cm×1.9 cm×40 µm by the sputtering method. The rest two counter electrodes of the four sheets of the counter electrodes were prepared by forming the catalyst layer which had a thickness of 5 nm and was composed of platinum on the titanium foil of 4.6 cm×2.0 cm×40 µm by the sputtering method. In addition, another first integrated sealing portion forming body was prepared and this first integrated sealing portion forming body was adhered to the surface facing the working electrode of the counter electrode in the same manner as above.

Thereafter, the first integrated sealing portion forming body adhered to the working electrode was allowed to face the first integrated sealing portion forming body adhered to the counter electrode, and thus the first integrated sealing portion forming bodies were superimposed on each other.

The first integrated sealing portion forming bodies were then melted by heating while applying a pressure to the first integrated sealing portion forming bodies in this state. The first sealing portion was formed between the working electrode and the counter electrode in this manner. At this time, the width P of the adhesive portion of the partitioning portion of the first integrated sealing portion with the surface on the conductive substrate side of the counter electrode, the width Q of the adhesive portion of the annular portion of the first integrated sealing portion with the surface on the conductive substrate side of the counter electrode, the width R of the partitioning portion of the first integrated sealing portion, and the width T of the annular portion thereof were as follows, respectively.
P=1.0 mm
Q=2.0 mm
R=2.6 mm
T=2.2 mm Next, the second integrated sealing portion was prepared. The second integrated sealing portion was obtained by preparing one sheet of resin film for sealing which had 8.0 cm×4.6 cm×50 µm and was composed of maleic anhydride modified polyethylene (trade name: Bynel, manufactured by Du Pont) and forming four quadrangular-shaped openings in the resin film for sealing. At this time, the second integrated sealing portion was fabricated such that each opening had a size of 1.7 cm×4.2 cm×50 µm, the width of the annular portion was 2 mm, and the width of the partitioning portion partitioning the inner opening of the annular portion was 2.6 mm. The second integrated sealing portion was bonded to the counter electrode so as to sandwich the edge portion of the counter electrode together with the first integrated sealing portion. At this time, the second integrated sealing portion was bonded to the counter electrode and the first integrated sealing portion by heating and melting the first integrated sealing portion and the second integrated sealing portion while pressing the second integrated sealing portion to the counter electrode.

Next, the desiccant sheet was bonded on the metal substrate of each counter electrode with a double-sided tape. The dimensions of the desiccant sheet were 1 mm in thickness×3 cm in length×1 cm in width, and Zeosheet (trade name, manufactured by Shinagawa Chemicals Co., Ltd.) was used as the desiccant sheet.

Next, silver particles (average particle diameter: 3.5 µm) as the first conductive particles, carbon (average particle diameter: 500 nm) as the inorganic filler, and a polyester-based resin as the binder resin were dispersed in diethylene glycol monoethyl ether acetate which is a solvent to fabricate a first conductive paste. At this time, the first conductive particles, the inorganic filler, the binder resin, and the solvent were mixed in a mass ratio of 70:1:10:19. Thereafter, this first conductive paste was coated on each of the metal substrates 21 of the cells 50A to 50D so as to have dimensions of 2 mm×2 mm×50 µm and temporarily dried at 85° C. for 10 minutes. A precursor of the first connecting portion was thus obtained.

On the other hand, silver particles (average particle diameter: 2 µm) as the second conductive particles and a polyester-based resin as the binder resin were dispersed in ethylene glycol monobutyl ether acetate to fabricate a second conductive paste. At this time, the second conductive particles, the binder resin, and the solvent were mixed at a mass ratio of 65:10:25.

Thereafter, the second conductive paste was coated so as to connect the wiring material connecting portions on the four transparent conductive layers 12A to 12C and 12E with the precursor of the first connecting portion formed on each of the metal substrates 21 of the cells 50A to 50D, respectively, and cured to form the wiring material 60P having a width of 2 mm. At this time, the wiring material 60P was formed by curing the second conductive paste at 85° C. for 12 hours.

Thereafter, as illustrated in FIG. 2, the bypass diodes 70A to 70D were disposed on the second integrated sealing portion, and the wiring material 60Q having a width of 2 mm was formed on the metal substrate 21 of the counter electrode 20 so as to connect each of the bypass diodes 70A to 70D with the first connecting portion 61 of each of the cells 50A to 50D. The wiring material 60Q was formed by coating the second conductive paste and curing it through a heat treatment at 85° C. for 12 hours. At this time, the first connecting portion was obtained from the precursor of the first connecting portion. As a bypass diode, the RB751V-40 manufactured by ROHM Co., Ltd. was used.

Next, the butyl rubber ("Aikameruto" manufactured by Aica Kogyo Co., Ltd.) was coated on the coupling portion 14 with a dispenser while being heated at 200° C. to form a precursor of the adhesive portion. On the other hand, a laminate, which is obtained by laminating a polybutylene terephthalate (PBT) resin film (50 μm in thickness), aluminum foil (25 μm in thickness), and a film (50 μm in thickness) composed of Bynel (trade name, manufactured by Du Pont) in this order, was prepared. Thereafter, the peripheral portion of this laminate 80A was superimposed on the precursor of the adhesive portion 80B, and a pressure was applied thereto for 10 seconds. In this manner, the back sheet 80 constituted by the adhesive portion 80B and the laminate 80A was obtained on the coupling portion 14. The module was obtained in the manner described above.

Examples 2 to 13 and Comparative Examples 1 to 3

Modules were fabricated in the same manner as in Example 1 except that the average particle diameter D1 (μm) of the first conductive particles in the first connecting portion, the content rate R1 (mass %) of the inorganic filler, the average particle diameter D2 of the inorganic filler, the binder resin, D1−D2, the average particle diameter (μm) of the second conductive particles in the wiring material, the content rate R2 (mass %) of the inorganic filler, the binder resin, and R1−R2 were respectively set as presented in Table 1.

[Evaluation on Characteristics]

The durability of the modules of Examples 1 to 13 and Comparative Examples 1 to 3 obtained in the manner described above was evaluated.

The photoelectric conversion efficiency ($\eta_0$) of the modules obtained in Examples 1 to 13 and Comparative Examples 1 to 3 was measured. Subsequently, the photoelectric conversion efficiency ($\eta$) of the modules obtained in Examples 1 to 13 and Comparative Examples 1 to 3 after being subjected to the heat cycle test conducted in conformity to JIS C 8938 was also measured. Thereafter, the retention rate of the photoelectric conversion efficiency (photoelectric conversion retention rate) was calculated based on the following formula:

Retention rate of photoelectric conversion efficiency (%)=$\eta/\eta_0 \times 100$ The results are presented in Table 1.

At this time, the measurement of photoelectric conversion efficiency was conducted by using a Xe lamp solar simulator (YSS-150 manufactured by Yamashita Denso Corporation) and an IV tester (MP-160 manufactured by EKO Instruments).

TABLE 1

|  | First connecting portion | | | | | Wiring material | | | | Durability |
|---|---|---|---|---|---|---|---|---|---|---|
|  | Average particle diameter D1 of first conductive particles (μm) | Content rate R1 of inorganic filler (mass %) | Average particle diameter D2 of inorganic filler (μm) | Binder resin | D1−D2 (μm) | Average particle diameter of second conductive particles (μm) | Content rate R2 of inorganic filler (mass %) | Binder resin | R1−R2 (mass %) | Photoelectric conversion retention rate (%) |
| Example 1 | 3.5 | 1.2 | 0.5 | Polyester-based | 3 | 2 | 0 | Polyester-based | 1.2 | 99 |
| Example 2 | 10 | 1.2 | 0.5 | Polyester-based | 9.5 | 2 | 0 | Polyester-based | 1.2 | 95 |
| Example 3 | 3.5 | 5.9 | 0.5 | Polyester-based | 3 | 2 | 0 | Polyester-based | 5.9 | 84 |
| Example 4 | 3.5 | 1.2 | 2 | Polyester-based | 1.5 | 2 | 0 | Polyester-based | 1.2 | 86 |
| Example 5 | 3.5 | 1.2 | 0.5 | Epoxy-based | 3 | 2 | 0 | Polyester-based | 1.2 | 95 |
| Example 6 | 3.5 | 1.2 | 0.5 | Polyester-based | 3 | 10 | 0 | Polyester-based | 1.2 | 89 |
| Example 7 | 3.5 | 1.2 | 0.5 | Polyester-based | 3 | 2 | 0 | Epoxy-based | 1.2 | 95 |
| Example 8 | 15 | 1.2 | 0.5 | Polyester-based | 14.5 | 2 | 0 | Polyester-based | 1.2 | 78 |
| Example 9 | 3.5 | 8 | 0.5 | Polyester-based | 3 | 2 | 0 | Polyester-based | 8 | 77 |
| Example 10 | 3.5 | 1.2 | 0.5 | Polyester-based | 3 | 15 | 0 | Polyester-based | 1.2 | 85 |

TABLE 1-continued

| | First connecting portion | | | | | Wiring material | | | | Durability |
|---|---|---|---|---|---|---|---|---|---|---|
| | Average particle diameter D1 of first conductive particles (μm) | Content rate R1 of inorganic filler (mass %) | Average particle diameter D2 of inorganic filler (μm) | Binder resin | D1-D2 (μm) | Average particle diameter of second conductive particles (μm) | Content rate R2 of inorganic filler (mass %) | Binder resin | R1-R2 (mass %) | Photoelectric conversion retention rate (%) |
| Example 11 | 3.5 | 1.2 | 0.5 | Acrylic | 3 | 2 | 0 | Polyester-based | 1.2 | 82 |
| Example 12 | 3.5 | 1.2 | 0.5 | Polyester-based | 3 | 2 | 0 | Acrylic | 1.2 | 90 |
| Example 13 | 3.5 | 5.9 | 0.5 | Polyester-based | 3 | 2 | 2.6 | Polyester-based | 3.3 | 77 |
| Comparative Example 1 | 3.5 | 1.2 | 5 | Polyester-based | −1.5 | 2 | 0 | Polyester-based | 1.2 | 61 |
| Comparative Example 2 | 3.5 | 1.2 | 0.5 | Polyester-based | 3 | 2 | 1.3 | Polyester-based | −0.1 | 53 |
| Comparative Example 3 | 3.5 | 1.2 | 3.5 | Polyester-based | 0 | 3.5 | 0 | Polyester-based | 1.2 | 65 |

As presented in Table 1, it has been found that the modules of Examples 1 to 13 have a greater photoelectric conversion retention rate than the modules of Comparative Examples 1 to 3.

From the above results, it has been confirmed that it is possible to have excellent durability according to the dye-sensitized photoelectric conversion element of the invention.

EXPLANATIONS OF NUMERALS

11 . . . Transparent substrate
12 . . . Transparent conductive layer
13 . . . Oxide semiconductor layer
15 . . . Transparent conductive substrate (conductive substrate)
16A . . . Wiring material connecting portion (portion to be connected)
20 . . . Counter electrode (counter substrate)
21 . . . Metal substrate
30A . . . Sealing portion
50 and 50A to 50D . . . Dye-sensitized photoelectric conversion cell
60P and 60P1 to 60P4 . . . Wiring material
61 . . . First connecting portion
100 to 500 . . . Dye-sensitized photoelectric conversion element

The invention claimed is:

1. A dye-sensitized photoelectric conversion element comprising at least one dye-sensitized photoelectric conversion cell, wherein
the dye-sensitized photoelectric conversion cell includes
a conductive substrate having a transparent substrate and a transparent conductive layer provided on the transparent substrate;
a counter substrate which faces the conductive substrate and includes a metal substrate;
an oxide semiconductor layer provided on the conductive substrate or the counter substrate;
an annular sealing portion bonding the conductive substrate and the counter substrate;
a first connecting portion connecting one end of at least one wiring material and the metal substrate; and
a portion to be connected which is connected to the other end of the wiring material, wherein
the first connecting portion contains first conductive particles, an inorganic filler, and a binder resin,
the wiring material contains second conductive particles and a binder resin,
the first conductive particles and the second conductive particles contain a common element,
an average particle diameter of the first conductive particles is greater than an average particle diameter of the inorganic filler in the first connecting portion, and
a content rate of the inorganic filler in the first connecting portion is greater than a content rate of the inorganic filler in the wiring material.

2. The dye-sensitized photoelectric conversion element according to claim 1, wherein a difference between the average particle diameter of the first conductive particles in the first connecting portion and the average particle diameter of the inorganic filler in the first connecting portion is from 0.5 to 5 μm.

3. The dye-sensitized photoelectric conversion element according to claim 1, wherein the average particle diameter of the first conductive particles is from 0.02 to 10 μm.

4. The dye-sensitized photoelectric conversion element according to claim 1, wherein a content rate of the first conductive particles in the first connecting portion is from 60 to 95 mass %.

5. The dye-sensitized photoelectric conversion element according to claim 1, wherein a content rate of the second conductive particles in the wiring material is from 50 to 95 mass %.

6. The dye-sensitized photoelectric conversion element according to claim 1, wherein the first conductive particles and the second conductive particles are identical metal particles.

7. The dye-sensitized photoelectric conversion element according to claim 1, wherein the inorganic filler is a conductive material.

8. The dye-sensitized photoelectric conversion element according to claim 1, wherein the average particle diameter of the inorganic filler is from 0.01 to 2 μm.

9. The dye-sensitized photoelectric conversion element according to claim 1, wherein the content rate of the inorganic filler in the first connecting portion is from 0.1 to 6 mass %.

10. The dye-sensitized photoelectric conversion element according to claim 1, wherein the binder resin of the first connecting portion and the binder resin of the wiring material are constituted by at least one kind selected from the group consisting of a polyester resin and an epoxy resin.

11. The dye-sensitized photoelectric conversion element according to claim 1, wherein the content rate of the inorganic filler in the wiring material is 0 mass %.

12. The dye-sensitized photoelectric conversion element according to claim 1, wherein a difference between the content rate of the inorganic filler in the wiring material and the content rate of the inorganic filler in the first connecting portion is from 0.1 to 6 mass %.

13. The dye-sensitized photoelectric conversion element according to claim 1, wherein the metal substrate is constituted by a metal capable of forming a passive state.

14. The dye-sensitized photoelectric conversion element according to claim 1, wherein
the sealing portion contains a resin,
the wiring material is in contact with the sealing portion, and
the first connecting portion is not in contact with the sealing portion.

* * * * *